United States Patent [19]

Jones et al.

[11] Patent Number: 4,794,517

[45] Date of Patent: Dec. 27, 1988

[54] THREE PHASED PIPELINED SIGNAL PROCESSOR

[75] Inventors: Gardner D. Jones; Larry D. Larsen, both of Raleigh, N.C.; Daniel J. Esteban, Cagnes Sur Mer, France

[73] Assignee: International Business Machines Corporation, Armonk, N.Y.

[21] Appl. No.: 723,991

[22] Filed: Apr. 15, 1985

[51] Int. Cl.[4] .............................................. G06F 15/00
[52] U.S. Cl. ..................................... 364/200; 364/736
[58] Field of Search ... 364/200 MS File, 900 MS File, 364/736

[56] References Cited

U.S. PATENT DOCUMENTS

| | | | |
|---|---|---|---|
| 4,179,734 | 12/1979 | O'Leary | 364/200 |
| 4,310,879 | 1/1982 | Pandeya | 364/200 |
| 4,399,507 | 8/1983 | Cosgrove, deceased et al. | 364/200 |
| 4,498,136 | 2/1985 | Sproul III | 364/200 |
| 4,598,358 | 7/1986 | Boddie et al. | 364/200 |

*Primary Examiner*—David Y. Eng
*Assistant Examiner*—Thomas C. Lee
*Attorney, Agent, or Firm*—Edward H. Duffield

[57] ABSTRACT

This processor is a single chip implementation of an architecture that is designed to expeditiously handle certain tasks commonly associated with signal processing. Sequential multiply and accumulate operations, in particular, can be accomplished quite efficiently. The processor is pipelined in two areas. Instructions are passed through a three phase pipeline and consist of fetch, decode and execute, while the multiplier utilizes a two phase pipeline. The data flow is parallel and of 16-bit width throughout. The instruction store is maintained separately from the data store and provisions are included for having the processor enabled to read and write its own instruction store. Some parallel or compound instructions are implemented to permit transfer actions such as storage or I/O to or from instruction registers to occur concurrently with a compute action in different segments of the data flow. The arithmetic capabilities of the processor include both the separate multiplier and a full arithmetic logic unit. Two DMA modes are permitted. Extensive diagnostic capabilities, some of which utilize the processor's ability to read and write its own instruction store, are also included.

1 Claim, 34 Drawing Sheets

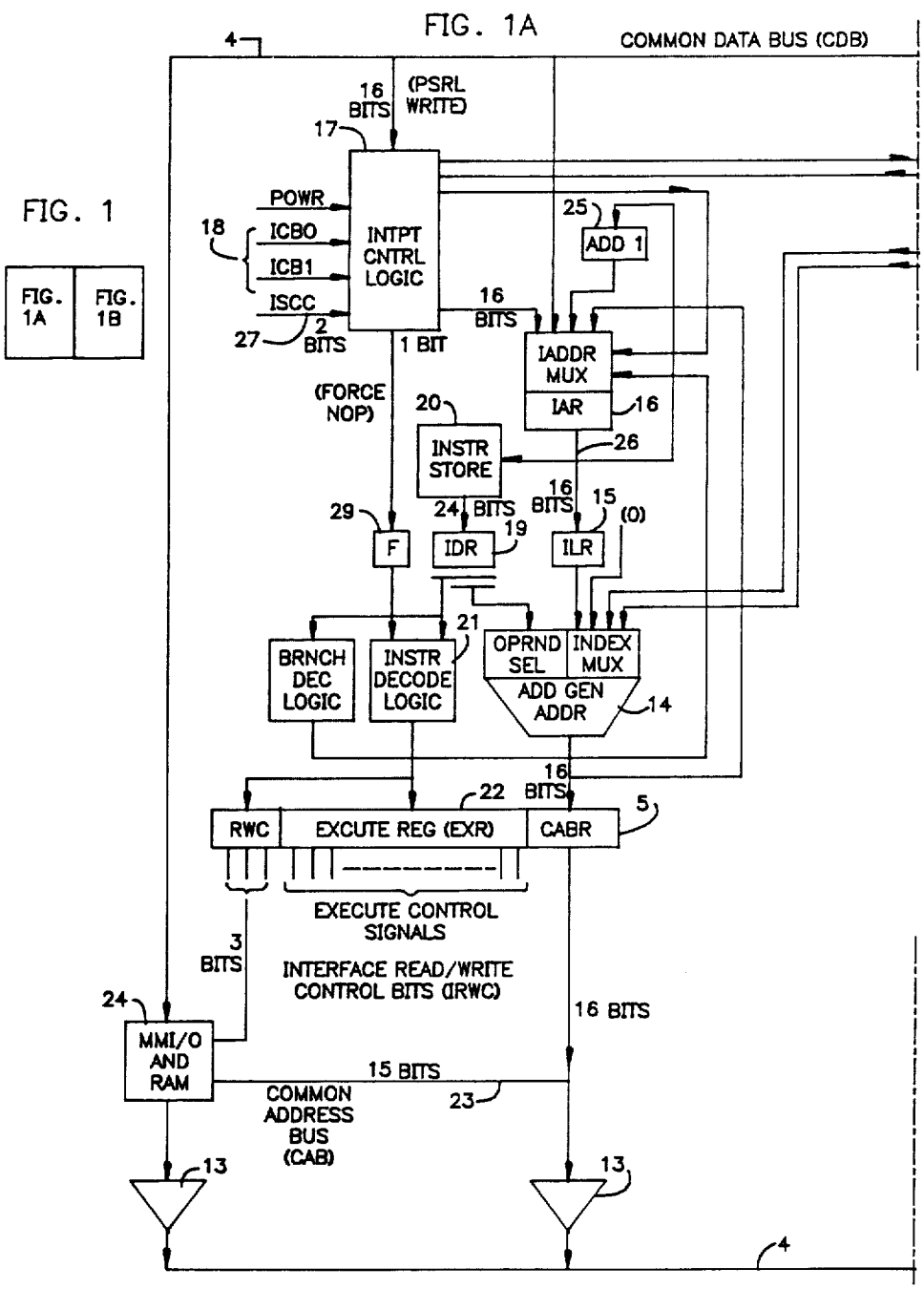

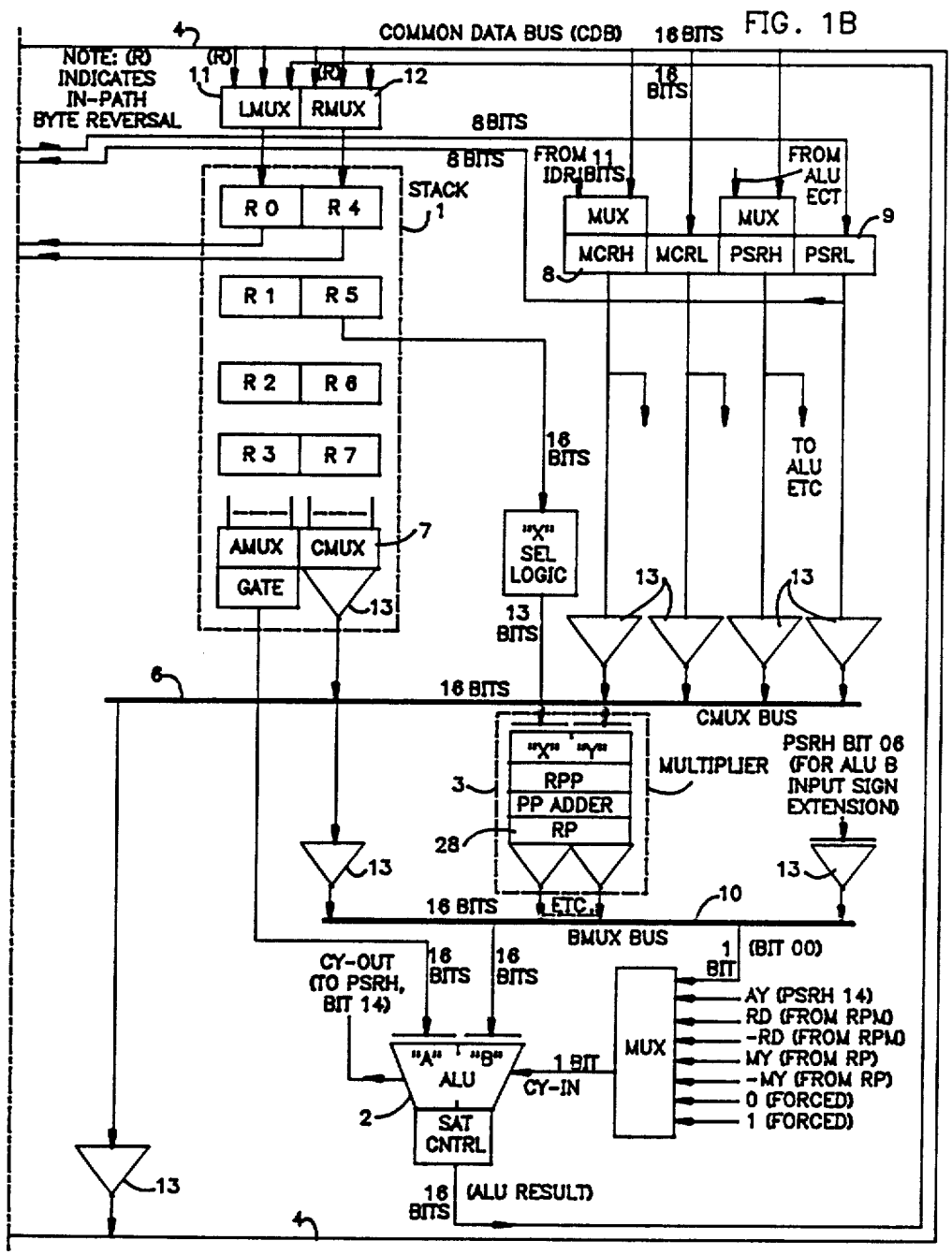

LIL (0000)
LIR (0001)
LOAD IMMEDIATE
LEFT/RIGHT

LIL/LIR EXECUTE ACTIONS:
1) (OPERAND + 0 OR <ILR> OR <R0> OR <R4>)→CDB
2) <CDB>→R(GHI)

L (0010)
LOAD

L EXECUTE ACTIONS:
1) <RAM(OPERAND + 0 OR <R0> OR <R4>)→CDB
1) <CDB>→R(GHI)

ST (0011)
STORE

ST EXECUTE ACTIONS:
1) <R(DEF)> → CMUX → CDB
2) <CDB>→RAM (OPERAND + 0 OR <R0> OR <R4>)

FIG. 4B

| INSTRUCTION BITS | | | | | | | | | | | | | | | | | | | | | | | | |
|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | |
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | |
| 0 | 1 | 0 | 0 | 1 | X | 0 | 0 | 1 | 1 | 1 | 1 | ◁ | | | | | OPERAND | | | | | | ▷ | IPA READ FORMAT |
|   |   |   |   |   | 0 1 |   |   |   |   |   |   |   |   |   |   |   |   |   |   |   |   |   |   | |

IPA READ EXECUTE ACTIONS (PHASE 2)

| COMBINATORIAL ACTION (DURING PHASE 2) | ACTION AT CLOCK TIME (ENDS PHASE 2) |
|---|---|
| UNCONDITIONAL DIRECT BRANCH: (OPERAND + 0 or <ILR> OR <R0> OR <R4>) DECODE COMBINATION OF BT = 00, BCS = 1111. | ➞IAR, CABR ➞SET FLAG TO FORCE LI, R5 AS NEXT DECODE. |

IPA READ EXECUTE ACTIONS (PHASE 3)

| COMBINATORIAL ACTION (DURING PHASE 3) | | ACTION AT CLOCK TIME (ENDS PHASE 3) |
|---|---|---|
| FOR IDR BITS 0 - 7 PLUS PARITY: FOR IDR BITS 8 - 23: | BITS 0 - 7 PARITY BITS (OPERAND + 0) | ➞ MCRH (BITS 8 - 15) ➞ MCRH (BITS 5 - 7) ➞ CABR |
| | FORCE DECODE OF LI, R5. | ➞ EXR |

IPA READ EXECUTE ACTIONS (PHASE 4)

| COMBINATORIAL ACTION (DURING PHASE 4) | | ACTION AT CLOCK TIME (ENDS PHASE 4) |
|---|---|---|
| FOR CABR (IDR BITS 8 - 23): | <CABR> | ➞ R5 |

FIG. 4C

| INSTRUCTION BITS | | | |
|---|---|---|---|
| 0 0 0 0 0 0 0 0 | 0 0 1 1 1 1 1 1 | 1 1 1 1 2 2 2 2 | |
| 0 1 2 3 4 5 6 7 | 8 9 0 1 2 3 4 5 | 6 7 8 9 0 1 2 3 | |
| 0 1 0 0 \| I X \| 0 1 | 1 1 1 1 | ◁—— OPERAND ——▷ | IPA WRITE FORMAT |
|              0 1   |   |   |   |

IPA WRITE DECODE ACTIONS (PHASE 2)

| COMBINATORIAL ACTION (DURING PHASE 2) | ACTION AT CLOCK TIME (ENDS PHASE 2) |
|---|---|
| UNCONDITIONAL INDIRECT BRANCH: <CDB> (OPERAND + 0 or <ILR> OR <R0> OR <R4>) | → IAR<br>→ CABR |
| DECODE COMBINATION OF OPCODE = 0100, BT = 01 AND BCS = 1111 AS ST, R5. | → SET FORCED DECODE OF ST, R5 INTO EXR<br>→ SET 110 INTO IRWC |

IPA READ EXECUTE ACTIONS (PHASE 3)

| COMBINATORIAL ACTION (DURING PHASE 3) | ACTION AT CLOCK TIME (ENDS PHASE 3) |
|---|---|
| CABR ← CAB; (INSTRUCTION BITS 0 - 7 PLUS PARITY BITS)<br>R5 ← CDB; (INSTRUCTION BITS 8 - 23) | → WRITE CAB 4 - 14 AND CDB 0 -15 TAKEN TOGETHER INTO INSTRUCTION STORE AS AN INSTURCTION. |

NOTES: 1) TABLES 4B AND 4C DO NOT REFLECT ANY ACTIONS OF INSTRUCTIONS PRECEDING OR FOLLOWING IPA READ OR WRITE INSTRUCTIONS; NOR DO THEY REFLECT ANY RESTRICTIONS IMPOSED BY THE ASSEMBLER.

COMPUTE EXECUTE ACTIONS (RE = ; FUN0 = 0,1)

NOTE: SEE FIG. 6A FOR MULTIPLIER (X) SCALING OPTIONS.

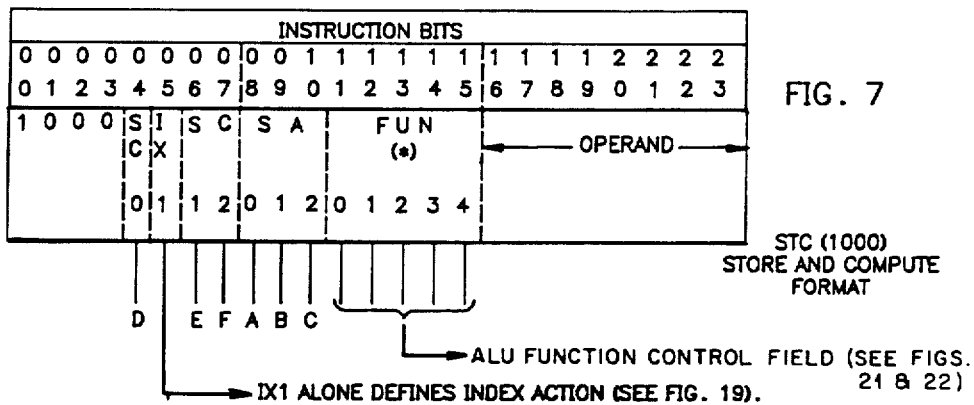

FIG. 7

STC (1000) STORE AND COMPUTE FORMAT

IX1 ALONE DEFINES INDEX ACTION (SEE FIG. 19).

ALU FUNCTION CONTROL FIELD (SEE FIGS. 21 & 22)

STC DECODE ACTIONS:
1) DECODE <IDR> → EXR
2) (OPERAND + <R0> OR < R4>) → CABR (→ CAB)
STC EXECUTE ACTIONS:
1) <R(DEF)> → CMUX → CDB, (AND MULTIPLICAND, UNDER MCR CONTROL)
2) <CDB> → RAM(CABR)
3) <CMUX> (WHEN FUN0 = 0) OR <RP> (WHEN FUN0 = 1) → BMUX
4) <BMUX> * <R(ABC)> → R(ABC)

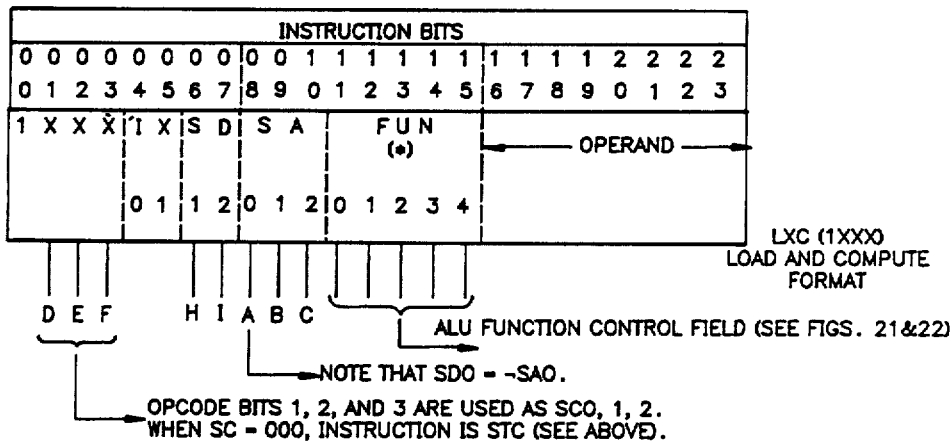

LXC (1XXX) LOAD AND COMPUTE FORMAT

NOTE THAT SD0 = -SA0.

ALU FUNCTION CONTROL FIELD (SEE FIGS. 21 & 22)

OPCODE BITS 1, 2, AND 3 ARE USED AS SC0, 1, 2.
WHEN SC = 000, INSTRUCTION IS STC (SEE ABOVE).

LXC DECODE ACTIONS:
1) DECODE<IDR> → EXR
2) (OPERAND + 0 OR <R0> OR <R4>) → CABR (→CDB)
LXC EXECUTE ACTIONS:
1) <RAM(CABR)> → CDB → R(-A,HI); WHEN IX0 = 1
  OR, (CABR) → CDB → R(-A,HI); WHEN IX0 = 0
2) <R(DEF)> → CMUX, (AND MULTIPLICAND, WHEN FUN0 = 1)
3) <CMUX>(WHEN FUN0 = 0) OR <RP> (WHEN FUN0 = 1) → BMUX
4) <BMUX> * <R(ABC)> → R(ABC)

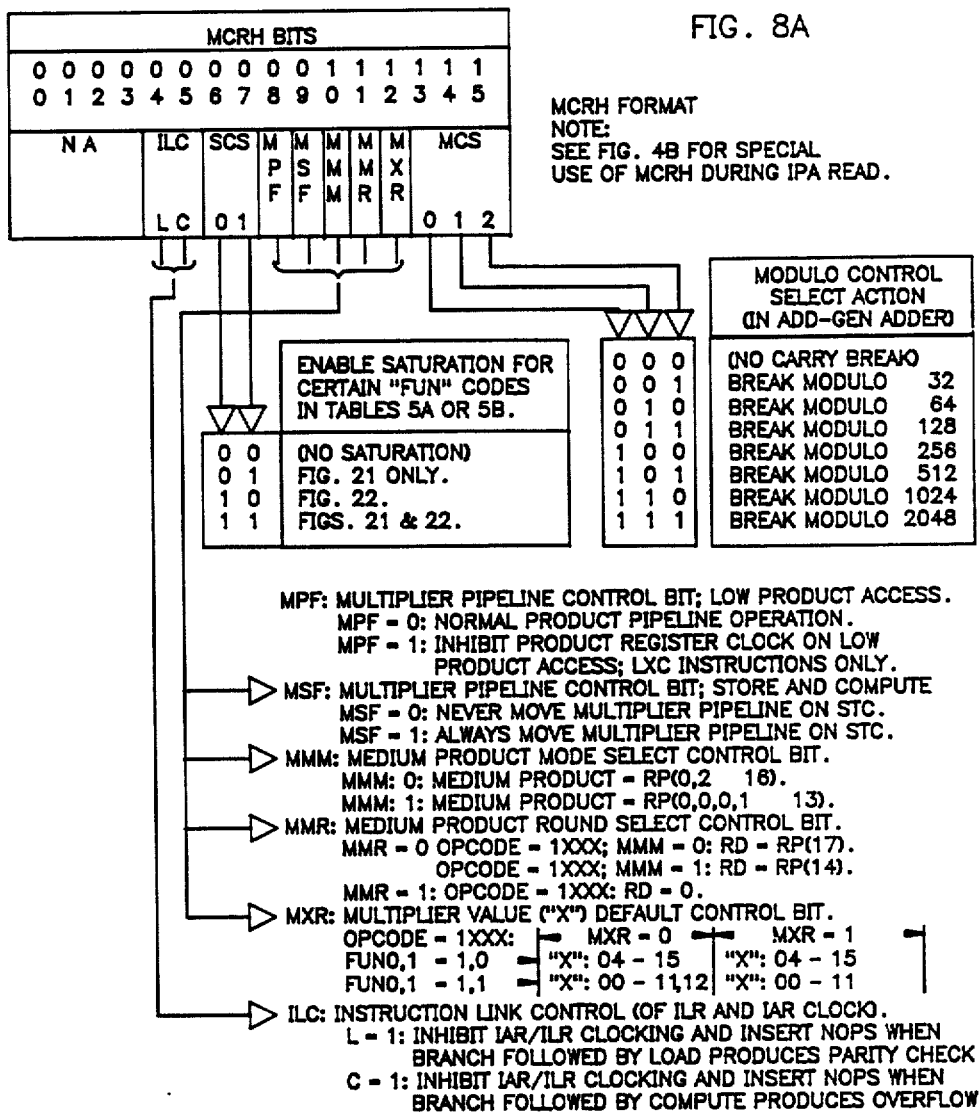

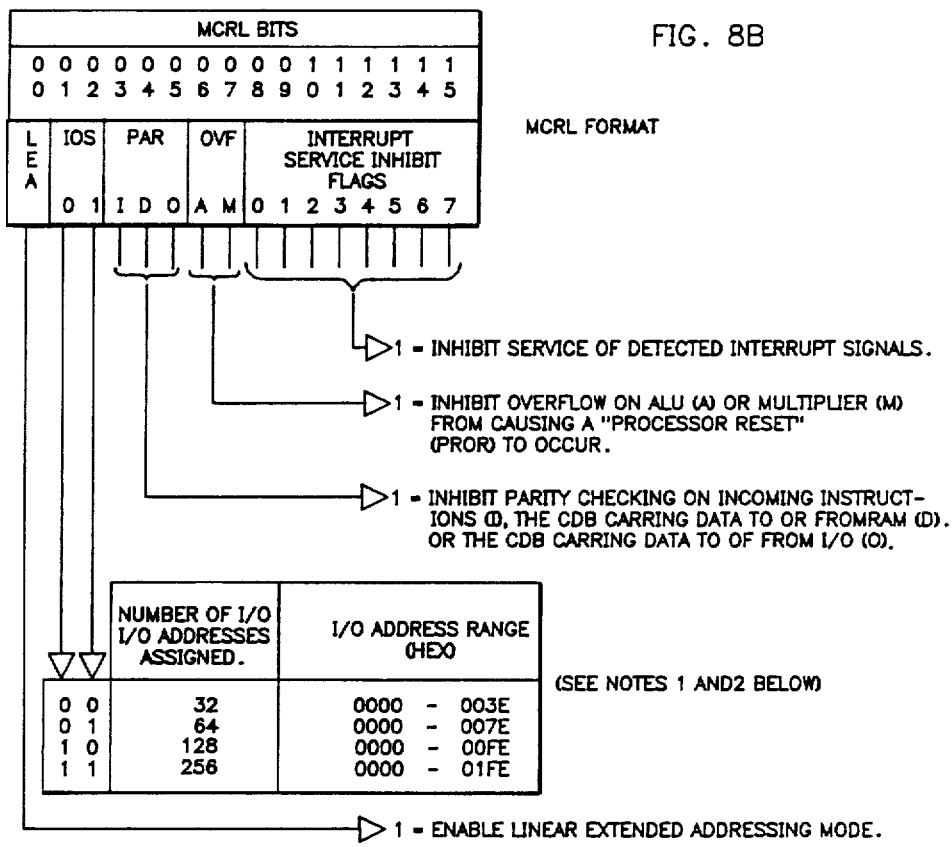

FIG. 8B

MCRL FORMAT (SEE NOTES 1 AND 2 BELOW)

NOTES:
1) I/O ADDRESSENG BEGINS AT LOCATION 0 (ZERO) AND EXTENDS TO THE LIMIT SPECIFIED BY THE IOS FIELD. LOGIC WITHIN GPSP-16 WILL MONITOR THE CAB AND DETERMINE WHEN I/O IS BEING ADDRESSED. WHEN IT IS, THE IRWC LINES IN THE INTERFACE WILL ASSUME THE APPROPRIATE STATE (SEE FIG. 15)

2) CAB BITS 00 - 14 ONLY COMPRISE THE I/O ADDRESS BUS. (CAB 15 IS NOT USED FOR ADDRESSING PURPOSES). AS A RESULT, INDIVIDUAL IS I/O ADDRESSES ARE ALWAYS CONSIDERED TO BE EVEN. THUS, THE 32 32 ADDRESSES SELECTED FOR IOS - 0 (FOR EXAMPLE) INCLUDE ALL THE EVEN ADDRESSES FROM 0000 TO 003E (HEX).

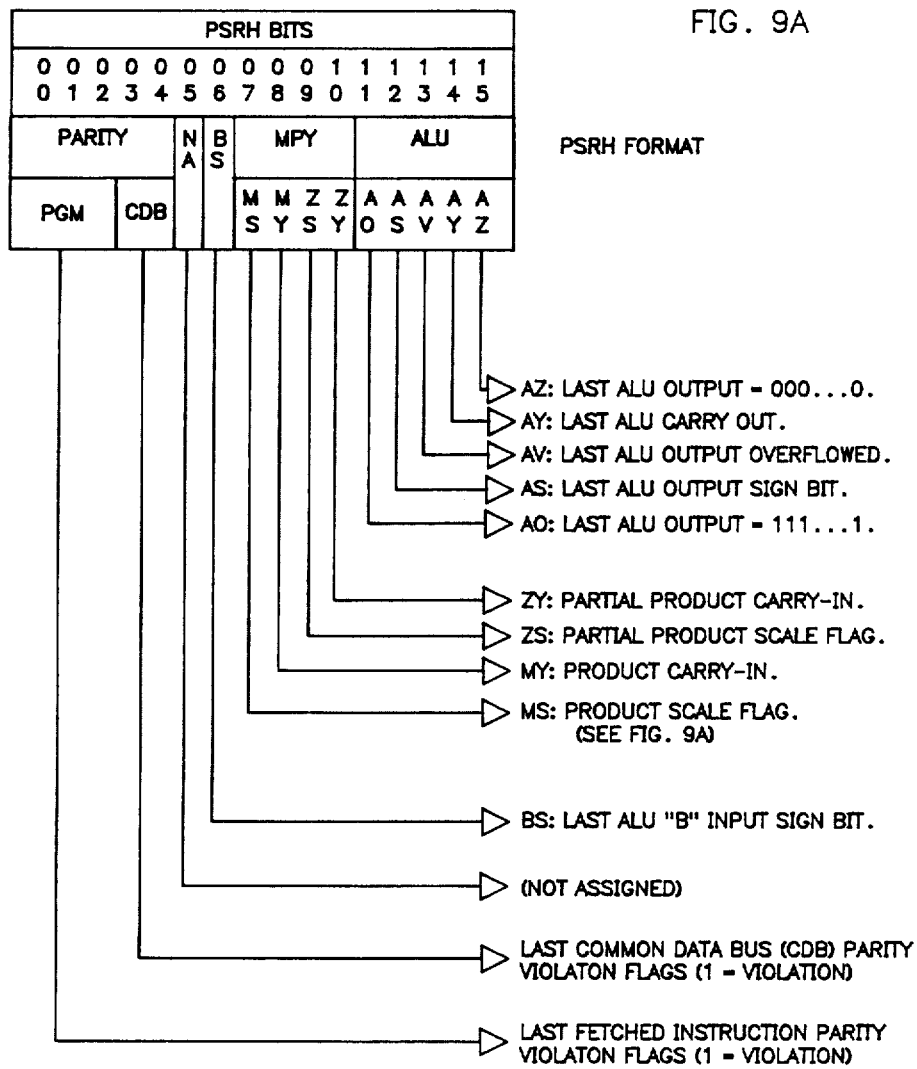

NOTES: (1) THE ACTUAL INTERRUPT SIGNAL "TESTED" DEPENDS ON POSITION OF SCAN CLOCK WHEN INSTRUCTION GENERATING THE TEST IS EXECUTED.
(2) POWR AND PROR FORCED BY FRC; BOTH CLEARED BY GROUP 1 CLR.

FIG. 10B
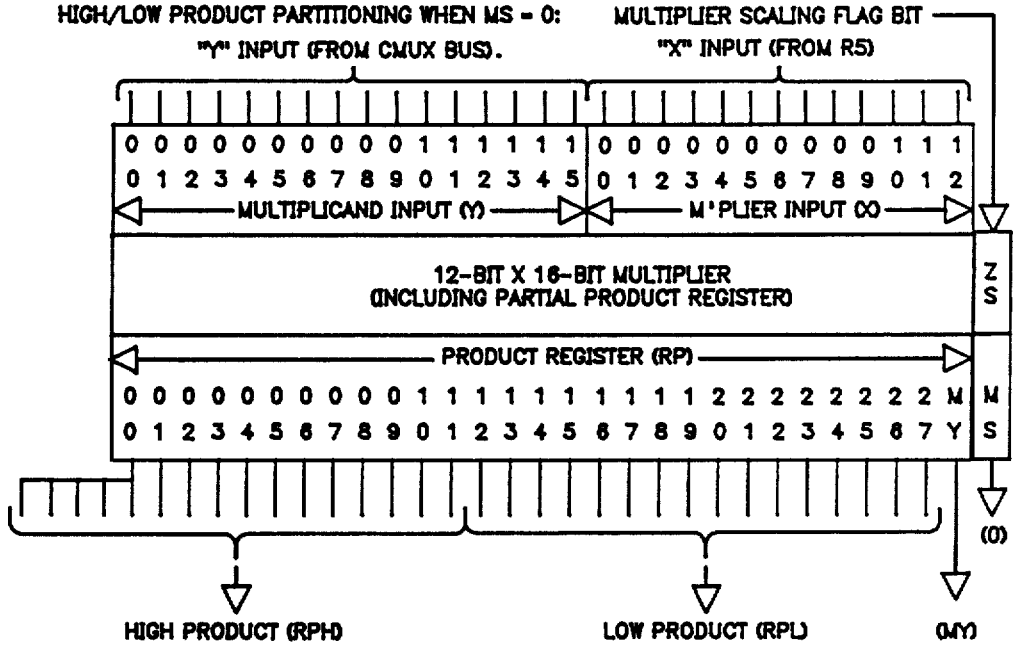
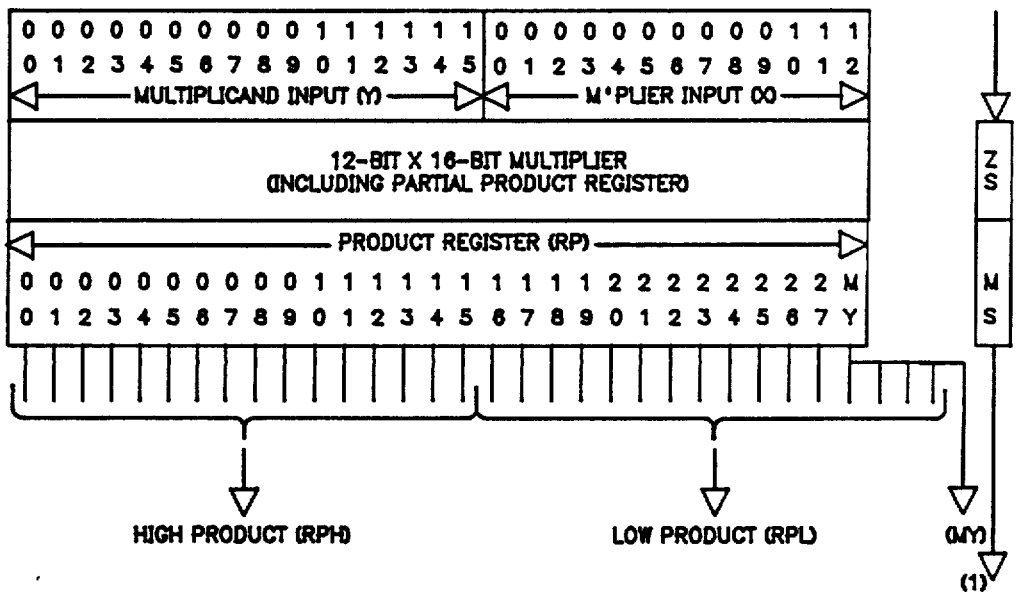

INSTRH: INSTRUCTION BITS 0 - 12
IABEXT: IAB 8 BIT EXTENSION
CABEXT: CAB 8 BIT EXTENSION
IRWEXT: IRW EXTENSION

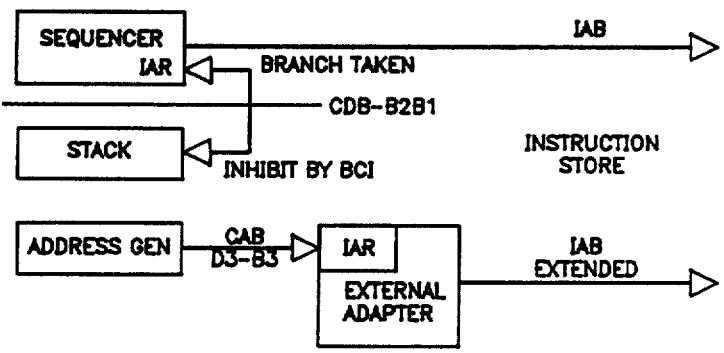
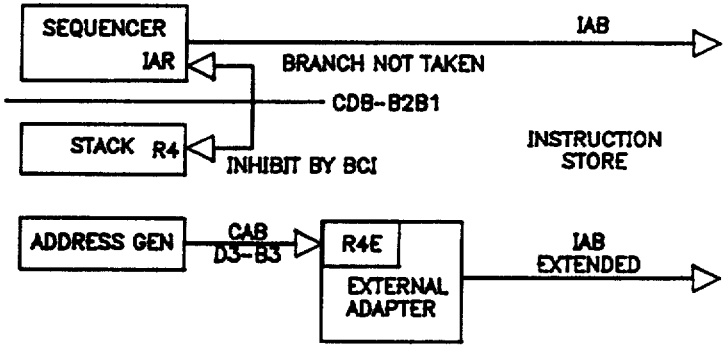
FIG. 13

FIG. 15

| IRWC BITS | | INTERFACE ACTION INDICATED |
|---|---|---|
| BIN (012) | SIG (012) | |
| | | LEAF NOT ENABLED (MCRL 00 = 0): |
| 0 0 0 | +++ | NO I/O OR MEMORY READ/WRITE |
| 0 0 1 | ++- | ENABLE IPA WRITE |
| 0 1 0 | +-+ | ENABLE MEMORY READ |
| 0 1 1 | +-- | ENABLE MEMORY WRITE |
| 1 0 0 | -++ | ENABLE I/O READ |
| 1 0 1 | -+- | ENABLE I/O WRITE |
| 1 1 0 | --+ | UNASSIGNED COMBINATION |
| 1 1 1 | --- | UNASSIGNED COMBINATION |
| | | LEAF NOT ENABLED (MCRL 00 = 1): |
| 0 0 0 | +++ | NO I/O OR MEMORY READ/WRITE |
| 0 0 1 | ++- | BRANCH TAKEN INDICATION |
| 0 1 0 | +-+ | ENABLE MEMORY READ |
| 0 1 1 | +-- | ENABLE MEMORY WRITE |
| 1 0 0 | -++ | ENABLE I/O READ |
| 1 0 1 | -+- | ENABLE I/O WRITE |
| 1 1 0 | --+ | UNASSIGNED COMBINATION |
| 1 1 1 | --- | POWER/PROCESSOR RESET INDICATION |

FIG. 16

TABLE 1: SUMMARY OF INSTRUCTION FORMATS

| REFERENCES | | INPT PRTCT | INSTRUCTION BITS |
|---|---|---|---|
| MEMO | FIGURES | | 0-7 \| 8-15 \| 16-23 |
| LIL LIR | 2A, 17-19 | ALL | `0 0 0 S I X S D` ... `◁── OPERAND ──▷` (SD at bit 3; IX at 4-5; SD at 6-7) |
| L | 2B, 17-19 | NONE | `0 0 1 0 I X S D` ... `◁── OPERAND ──▷` (trailing SDO) |
| ST | 2C, 17-19 | NONE | `0 0 1 1 I X S C` ... `◁── OPERAND ──▷` (trailing SCO) |
| BC | 4A,4B, 17-20 | ALL | `0 1 0 0 I X B T B C S` ... `◁── OPERAND ──▷` |
| LIBY | 3, 17-20 | NONE | `0 1 0 1 I X DBS SA/SD ZIS` ... `◁── OPERAND ──▷` |
| BLU | 4A, 4B, 17-20 | ALL | `0 1 1 0 I X B T` ... `◁── OPERAND ──▷` |
| C | 6A,6B, 6C,6D, 17,18, 21,22 | WHEN: II=1 | `0 1 1 1 R L S C S A F U N U I S A C M R S` (RXPCH; SC; SA; FUN; UE II SI AI CIE ME RE SCO) |
| STC | 7, 17-18, 21,22 | WHEN: FUN= XX001 | `1 0 0 0 S I C X S C S A F U N` ... `◁── OPERAND ──▷` |
| LXCn WHERE n= 1-7 | 7, 17-19, 21,22 | WHEN: FUN= XX001 | `1 S C I X S D S A F U N` ... `◁── OPERAND ──▷` |

FIG. 17

TABLE 2A
INSTRUCTION DECODE AND EXECUTE ACTIONS (OPCODES 0 — 7)

| OPCODE | | PHASE 2 (DECODE) | | PHASE 3 (EXECUTE) | |
|---|---|---|---|---|---|
| HEX | MNEM | COMBINATORIAL ACTION | CLKD INTO | COMBINATORIAL ACTION | CLKD INTO |
| 0 | LIL | DECODE <IDR><br><OPD> + <R●IX> → | EXR<br>CABR | <CABR> → CDB →<br><br>(R●SD = R4 - R7 ONLY) | R●SD |
| 1 | LIR | DECODE <IDR><br><OPD> + <R●IX> → | EXR<br>CABR | <CABR> → CDB → | R●SD |
| 2 | L | DECODE <IDR><br><OPD> + <R●IX> → | EXR<br>CABR | <RAM@CABR> → CDB → | R●SD |
| 3 | ST | DECODE <IDR><br><OPD> + <R●IX> → | EXR<br>CABR | <RN> → CMUX → CDB → | RAM<br>CABR |
| 4 | BC | DECODE<IDR><br><OPD> + <R●IX>* *<br><IAR> + 1 *(OR)* →<br><CDB> * * | IAR | GENERALLY NO ACTION<br>ON PHASE 3.<br>SEE FIG. 3 AND<br>TABLE 4 FOR DETAILS. | NONE |
| 5 | LIBY | DECODE <IDR><br><OPD> + <R●IX> → | EXR<br>CABR | BYTE<RAM>CABR)> → CDB →<br>BYTE'<ALUF> OR 00...0 →<br>NOTE: SA→→SD<br>(BYTE':SEE NOTE BELOW). | R●SD<br>R●SA |
| 6 | BLU | DECODE <IDR><br><OPD> + <R●IX>* *<br>*(OR)* →<br><CDB> * * | IAR | GENERALLY NO ACTION<br>ON PHASE 3.<br>SEE FIG. 4<br>FOR DETAILS | NONE |
| 7 | C | DECODE <IDR><br><br>(SEE FIG. 5 FOR<br>COMPUTE DETAILS). | EXR | <R●SC> OR <MCRN><br>OR <PSRN> →<CMUX><br><CMUX> OR <RPN> → BMUX<br><AMUX> * <BMUX> → | R●SA |

NOTES: R●   STACK REGISTER SPECIFIED BY ...
       R●IX  INDEX REGISTER SPECIFIED BY IX FIELD (SEE FIG. 19).
       BYTE'  OTHER HALF OF SAME REGISTER NOT SPECIFIED BY "BYTE".
       OPD   OPERAND FIELD CONTAINED IN THE INSTRUCTION.

FIG. 18

TABLE 2B
INSTRUCTION DECODE AND EXECUTE ACTIONS (OPCODES 8 — F)

| OPCODE | | PHASE 2 (DECODE) | | PHASE 3 (DECODE) | |
|---|---|---|---|---|---|
| HEX | MNEM | COMBINATORIAL ACTION | CLKD INTO | COMBINATORIAL ACTION | CLKD INTO |
| 8 | STC | DECODE <IDR> ➡<br><OPD> + <R⊕IX> ➡ | EXR<br>CABR | <R⊕SC>➡CMUX ➡CDB ➡<br><R⊕SA>➡AMUX<br><CMUX> OR <RPN> ➡BMUX<br><AMUX> * <BMUX> ➡ | RAM⊕<br>CABR<br><br>R⊕SA |
| 9 | LXC1 | DECODE <IDR> ➡<br><OPD> + <R⊕IX> ➡ | EXR<br>CABR | CONTENTS ➡CDB ➡<br><R1> ➡CMUX<br><CMUX> OR <RPN> ➡BMUX<br><AMUX> * <BMUX> ➡ | R⊕SD<br><br><br>R⊕SA |
| A | LXC2 | DECODE <IDR> ➡<br><OPD> + <R⊕IX> ➡ | EXR<br>CABR | CONTENTS ➡CDB ➡<br><R2> ➡CMUX<br><CMUX> OR <RPN> ➡BMUX<br><AMUX> * <BMUX> ➡ | R⊕SD<br><br><br>R⊕SA |
| B | LXC3 | DECODE <IDR> ➡<br><OPD> + <R⊕IX> ➡ | EXR<br>CABR | CONTENTS ➡CDB ➡<br><R3> ➡CMUX<br><CMUX> OR <RPN> ➡BMUX<br><AMUX> * <BMUX> ➡ | R⊕SD<br><br><br>R⊕SA |
| C | LXC4 | DECODE <IDR> ➡<br><OPD> + <R⊕IX> ➡ | EXR<br>CABR | CONTENTS ➡CDB ➡<br><R4> ➡CMUX<br><CMUX> OR <RPN> ➡BMUX<br><AMUX> * <BMUX> ➡ | R⊕SD<br><br><br>R⊕SA |
| D | LXC5 | DECODE <IDR> ➡<br><OPD> + <R⊕IX> ➡ | EXR<br>CABR | CONTENTS ➡CDB ➡<br><R5> ➡CMUX<br><CMUX> OR <RPN> ➡BMUX<br><AMUX> * <BMUX> ➡ | R⊕SD<br><br><br>R⊕SA |
| E | LXC6 | DECODE <IDR> ➡<br><OPD> + <R⊕IX> ➡ | EXR<br>CABR | CONTENTS ➡CDB ➡<br><R6> ➡CMUX<br><CMUX> OR <RPN> ➡BMUX<br><AMUX> * <BMUX> ➡ | R⊕SD<br><br><br>R⊕SA |
| F | LXC7 | DECODE <IDR> ➡<br><OPD> + <R⊕IX> ➡ | EXR<br>CABR | CONTENTS ➡CDB ➡<br><R7> ➡CMUX<br><CMUX> OR <RPN> ➡BMUX<br><AMUX> * <BMUX> ➡ | R⊕SD<br><br><br>R⊕SA |

NOTES: R⊕SD➡HIGH NIT OF THE SD FIELD, SDO, EQUALS -SAO
FOR ALL SXCN INSTRUCTIONS.

'CONTENTS' ➡ <CABR> WHEN IXO = 0; <RAM⊕CABR> WHEN IXO = 1.
RPN ➡ PRODUCT REGISTER IMPLIED BY FUN FIELD (SEE FIG. 22).

FIG. 19

TABLE 3
SUMMARY OF INDEX
CONTROL ACTIONS

| | | ADDRESS GENERATE ADDER INPUTS (A AND B) FOR EACH POSSIBLE IX: | | | | | | | |
|---|---|---|---|---|---|---|---|---|---|
| OPCODE | | IX = 00 | | IX = 01 | | IX = 10 | | IX = 11 | |
| X | MNEM | (A + B) | •N | (A + B) | •N | (A + B) | •N | (A + B) | •N |
| 0 | LIL | A1 + 0 | | A1 + ILR | •1 | A1 + RO | •1 | A1 + RO | •1 |
| 1 | LIR | A1 + 0 | | A1 + ILR | •1 | A1 + RO | •1 | A1 + RO | •1 |
| 2 | L | A2 + 0 | | | •4 | A2 + RO | •2 | A2 + RO | •2 |
| 3 | ST | A2 + 0 | | | •4 | A2 + RO | •2 | A2 + RO | •2 |
| 4 | BC | A3 + 0 | | A3 + ILR | •1 | A3 + RO | •1 | A3 + RO | •1 |
| 5 | LIBY | A3 + 0 | | | •4 | A3 + RO | •1 | A3 + RO | •1 |
| 6 | BLU | A1 + 0 | | A1 + ILR | •1 | A1 + RO | •1 | A1 + RO | •1 |
| 7 | C | | •3 | | •3 | | •3 | | •3 |
| 8 | STC | A4 + RO | •5 | A4 + R4 | •5 | A4 + RO | •5 | A4 + R4 | •5 |
| 9 | LXC1 | A5 + RO,R4,0 | •6 | A5 + RO,R4,0 | •6 | A4 + RO | •2 | A4 + R4 | •2 |
| A | LXC2 | A5 + RO,R4,0 | •6 | A5 + RO,R4,0 | •6 | A4 + RO | •2 | A4 + R4 | •2 |
| B | LXC3 | A5 + RO,R4,0 | •6 | A5 + RO,R4,0 | •6 | A4 + RO | •2 | A4 + R4 | •2 |
| C | LXC4 | A5 + RO,R4,0 | •6 | A5 + RO,R4,0 | •6 | A4 + RO | •2 | A4 + R4 | •2 |
| D | LXC5 | A5 + RO,R4,0 | •6 | A5 + RO,R4,0 | •6 | A4 + RO | •2 | A4 + R4 | •2 |
| E | LXC6 | A5 + RO,R4,0 | •6 | A5 + RO,R4,0 | •6 | A4 + RO | •2 | A4 + R4 | •2 |
| F | LXC7 | A5 + RO,R4,0 | •6 | A5 + RO,R4,0 | •6 | A4 + RO | •2 | A4 + R4 | •2 |

| KEY | "A" ADDEND CONFIGURATIONS (•7) |
|---|---|
| A1 | B08 B09 B10 B11 B12 B13 B14 B15 B16 B17 B18 B19 B20 B21 B22 B23 |
| A2 | B08 B09 B10 B11 B12 B13 B14 B15 B16 B17 B18 B19 B20 B21 B22 0 |
| A3 | B12 B12 B12 B12 B12 B13 B14 B15 B16 B17 B18 B19 B20 B21 B22 B23 |
| A4 | 0   0   0   0   0   0   0   B23 B16 B17 B18 B19 B20 B21 B22 0 |
| A5 | 0   0   0   0   0   0   0   0   B16 B17 B18 B19 B20 B21 B22 0 |
| A6 | 1   1   1   1   1   1   1   1   B16 B17 B18 B19 B20 B21 B22 0 |

• N (NOTES):
• 1 – NEVER ADD CIRCULAR, EVEN WHEN CARRY BREAK ENABLED.
• 2 – ADD CIRCULAR WHEN RO/R4 CONTENTS ODD AND BREAK ENABLED.
• 3 – THE COMPUTE INSTRUCTION HAS NO IX FIELD.
• 4 – UNASSIGNED IX FIELD COMBINATION.
• 5 – IX1 (BIT 05) ALONE DEFINES INDEX ACTION; BIT 04 = SCO.
    NOTE 2 ALSO APPLIES.
• 6 – LOAD IMMEDIATE (AND COMPUTE) OPERATION; NOTE 2 ALSO APPLIES
    WHEN SD1,2 = 00 AND SAO = 1: ADD <RO> TO A5 OR A6; RESULT TO RO.
    WHEN SD1,2 = 00 AND SAO = 0: ADD <R4> TO A5 OR A6; RESULT TO R4.
    WHEN SD ≠ 00: ALWAYS ADD ZERO TO A5 OR A6; RESULT TO RN, WHERE
         N = 1,2,3,5,6,7.
•7 – BN (N = 8,9,10,....23) ARE OPERAND BITS FROM THE INSTRUCTIONS.

FIG. 20

TABLE 4
BRANCH CONDITION SELECT CODES
(CONDITIONAL BRANCH - OPCODE - 0100)

| BCS FIELD | | SELECTED BRANCH CONDITION | REF MNEMO | NOTES (BELOW) | CONDITION SIGNALS (FROM ALU) | | | | | CONDITION LOGIC |
|---|---|---|---|---|---|---|---|---|---|---|
| HEX | CODE | | | | Z | S | C | 1 | V | |
| 0 | 0000 | U > 0 | BP | | 0 | 0 | - | - | - | ¬Z AND ¬S |
| 1 | 0001 | U >= 0 | BNN | | - | 0 | - | - | - | ¬S |
| 2 | 0010 | U <= 0 | BNP | | 1 | 1 | - | - | - | Z OR S |
| 3 | 0011 | U < 0 | BN | | - | 1 | - | - | - | S |
| 4 | 0100 | U' > 2**16 | BH | | 0 | - | 1 | - | - | ¬Z AND C |
| 5 | 0101 | U' >=2**16 | BNL | | - | - | 1 | - | - | C |
| 6 | 0110 | U' <= **16 | BNH | | 1 | - | 0 | - | - | Z OR ¬C |
| 7 | 0111 | U' < **16 | BL | | - | - | 0 | - | - | ¬C |
| 8 | 1000 | U ¬= 0... | BNZ | | 0 | - | - | - | - | ¬Z |
| 9 | 1001 | U ¬= 1... | BNO | | - | - | - | 0 | - | ¬1 |
| A | 1010 | U = 0... | BZ | | 1 | - | - | - | - | Z |
| B | 1011 | U = 1... | BO | | - | - | - | 1 | - | 1 |
| C | 1100 | U = MIXED | BM | | 0 | - | - | 0 | - | ¬Z AND ¬1 |
| D | 1101 | SPECIAL BCH. | | 1 | - | - | - | - | - | |
| E | 1110 | OVERFLOW | BV | | - | - | - | - | 1 | V |
| F | 1111 | SPECIAL BCH. | | 1, 2 | - | - | - | - | - | |

ABBREVIATIONS:  U = THE SET OF 16 ALU OUTPUT BITS.
U' = ALU CARRY OUT AND U CATENATED (C,U).
Z' = U IS ALL ZEROS (000...0).
S' = SIGN BIT OF ALU
C = CARRY OUT OF ALU.
1 = U IS ALL ONES (111...1).
V = ALU OVERFLOW DETECTED).
- = DON'T CARE.
¬ = LOGICAL NOT.

NOTES: 1) BCS CODES 1101 AND 1111 WITH BT ¬ = 10 INITIATE UNCONDITIONAL BRANCH ACTIONS (SEE BRANCH TYPE IN FIG. 4A FOR DETAILS).
2) FIGS. 4B AND 4C DEFINE ACTIONS FOR IPA READ AND WRITE OPERATIONS.

FIG. 21

TABLE 5A
GENERAL ARITHMETIC ALU FUNCTION CONTROL CODES

| "FUN" FIELD CODES 11111 12345 | ALU ACTION FOR COMPUTE INSTRUCTION (OPCODE = 0111) GIVEN: AI = 0, SI = 0 AND CIE = 1. | | | | | | | ALU OVER- FLOW GIVES SATUR'D RESULT? | INDIVIDUAL CONTROL DEFAULTS (OP = 1XXX) | | | | | | | | | REF MNEMO |
|---|---|---|---|---|---|---|---|---|---|---|---|---|---|---|---|---|---|---|
| | "A" VAL | | "B" VAL | | + CIN | = | DEST | | RXC | LPH | UEE | IEI | SII | AIE | CIE | ME | RE | |
| 00000 | <R●SA> | + | <R●SC> | + | 0 | = | R●SA | NEVER | 0 | 0 | 1 | 0 | 0 | 1 | 0 | 0 | 0 | LHR |
| 00001 | <R●SA> | + | 0 | + | 0 | = | R●SA | NEVER | 0 | 0 | 0 | 1 | 1 | 0 | 0 | 0 | 0 | THR |
| 00010 | <R●SA> | + | <R●SC> | + | 0 | = | R●SA | NEVER | 0 | 0 | 1 | 0 | 0 | 0 | 0 | 0 | 0 | AHR |
| 00011 | <R●SA> | + | <R●SC> | + | 0 | *= | R●SA | ALWAYS | 0 | 0 | 1 | 0 | 0 | 0 | 0 | 0 | 0 | AHRV |
| 00100 | <R●SA> | + | <R●SC> | + | 0 | = | R●SA | NEVER | 0 | 0 | 1 | 0 | 0 | 1 | 0 | 0 | 0 | ZHR |
| 00101 | <R●SA> | + | -<R●SC> | + | 1 | = | R●SA | NEVER | 0 | 0 | 1 | 0 | 0 | 1 | 1 | 0 | 0 | LHRN |
| 00110 | <R●SA> | + | \|<R●SC>\| | + | BO | = | R●SA | NEVER | 0 | 0 | 1 | 0 | 0 | 0 | 1 | 0 | 0 | AHRP |
| 00111 | <R●SA> | + | \|<R●SC>\| | + | BO | = | R●SA | NEVER | 0 | 0 | 1 | 0 | 0 | 1 | 1 | 0 | 0 | LHRP |
| 01000 | <R●SA> | + | -<R●SC> | + | 1 | = | R●SA | NEVER | 0 | 0 | 1 | 0 | 0 | 0 | 1 | 0 | 0 | SHR |
| 01001 | <R●SA> | + | -<R●SC> | + | 1 | = | R●SA | NEVER | 0 | 0 | 0 | 1 | 1 | 0 | 1 | 0 | 0 | CHR |
| 01010 | <R●SA> | + | -<R●SC> | + | AY | = | R●SA | NEVER | 0 | 0 | 1 | 0 | 0 | 0 | 1 | 0 | 0 | SHR |
| 01011 | <R●SA> | + | -<R●SC> | + | 1 | *= | R●SA | ALWAYS | 0 | 0 | 1 | 0 | 0 | 0 | 1 | 0 | 0 | SHRV |
| 01100 | <R●SA> | AND | <R●SC> | + | 0 | = | R●SA | NEVER | 0 | 0 | 1 | 0 | 0 | 0 | 0 | 0 | 0 | NHR |
| 01101 | <R●SA> | XOR | -<R●SC> | + | 0 | = | R●SA | NEVER | 0 | 0 | 1 | 0 | 0 | 0 | 0 | 0 | 0 | XHRC |
| 01110 | <R●SA> | + | <R●SC> | + | AY | = | R●SA | NEVER | 0 | 0 | 1 | 0 | 0 | 1 | 0 | 0 | 0 | AHR |
| 01110 | <R●SA> | + | <R●SC> | + | AY | = | R●SA | NEVER | 0 | 0 | 1 | 0 | 0 | 1 | 0 | 0 | 0 | ZAHR |
| 01111 | <R●SA> | OR | <R●SC> | + | 0 | = | R●SA | NEVER | 0 | 0 | 1 | 0 | 0 | 0 | 0 | 0 | 0 | OHR |

CONVENTIONS AND GENERAL ABBREVIATIONS (ALSO SEE FIG. 22):

- ¬ = LOGICAL NOT (BIT INVERSION).
- R●... = REGISTER SPECIFIED BY ...
- <...> = CONTENTS OF ...
- |...| = MAGNITUDE OF ... (ONE'S COMPLEMENT WHEN ... NEGATIVE).
- CIN = CARRY-IN TO LOW-ORDER ALU BIT POSITION.
- SA = SELECTED A-SOURCE/DESTINATION STACK REGISTER ADDRESS.
- SC = SELECTED C-SOURE STACK REGISTER ADDRESS.
- *= = MOVE SATURATED VALUE TO DESTINATION STACK REGISTER ADDRESS.
- BO = SIGN BIT (BIT 0) OF <R SC> IS SELECTED AS CIN.
- RD = MEDIUM PRODUCT ROUND BIT IS SELECTED AS CIN.
- MY = LOW PRODUCT CARRY BIT IS SELECTED AS CIN.
- AY = PREVIOUSLY SAVED ALU CARRY-OUT (FROM PSR IS SELECTED AS CIN.
- RPL = LOW PRODUCT REGISTER.
- RPM = MEDIUM PRODUCT REGISTER.
- RPH = HIGH PRODUCT REGISTER.
- M6&UE = SATURATION IS CONTROLLED BY MCRH BIT-06 (BIT-07) ANDED
- (M7&UE) WITH UE FOR OPCODE 0111 (COMPUTE). THE DEFAULT VALUE OF UE APPLIES FOR OPCODES = 1XXX.

FIG. 22

TABLE 5B
ALU FUNCTION CONTROL CODES
WITH IMPLICIT PRODUCT REGISTER ACCESS

| "FUN" FIELD CODES 11111 12345 | ALU ACTION FOR COMPUTE INSTRUCTION (OPCODE = 0111) GIVEN: AI = 0, SI = 0 AND CIE = 1. | | | | ALU OVER-FLOW GIVES SATUR'D RESULT? | INDIVIDUAL CONTROL DEFAULTS (OP = 1XXX) | | | | | | | | | REF MNEMO |
|---|---|---|---|---|---|---|---|---|---|---|---|---|---|---|---|
| | "A" VAL | + | "B" VAL | + CIN → DEST | | RXC | LPH | UE | II | SI | AI | CIE | ME | RE | |
| | SCALE MULTIPLIER VALUE RIGHT. | | | | | | | | | | | | | | |
| 10000 | <R●SA> | + | <RPM> | + RD → R●SA | M6&UE | 0 | 0 | 1 | 0 | 0 | 1 | 1 | 1 | 0 | LHR |
| 10001 | <R●SA> | + | ¬<RPH> | + 1 → R●SA | M6&UE | 0 | 0 | 0 | 1 | 1 | 1 | 0 | 1 | 0 | PNMOP |
| 10010 | <R●SA> | + | <RPL> | + MY → R●SA | M6&UE | 0 | 0 | 1 | 0 | 0 | 0 | 1 | 1 | 0 | AHR |
| 10011 | <R●SA> | + | <RPL> | + ¬MY → R●SA | M6&UE | 0 | 0 | 1 | 0 | 0 | 0 | 1 | 1 | 0 | SHR |
| 10100 | <R●SA> | + | <RPM> | + RD → R●SA | M6&UE | 0 | 0 | 1 | 0 | 0 | 0 | 1 | 1 | 0 | AHR |
| 10101 | <R●SA> | + | ¬<RPM> | + ¬RD → R●SA | M6&UE | 0 | 0 | 1 | 0 | 0 | 0 | 1 | 1 | 0 | SHR |
| 10110 | <R●SA> | + | <RPH> | + AY → R●SA | M6&UE | 0 | 0 | 1 | 0 | 0 | 0 | 1 | 1 | 0 | AHR |
| 10111 | <R●SA> | + | ¬<RPH> | + AY → R●SA | M6&UE | 0 | 0 | 1 | 0 | 0 | 0 | 1 | 1 | 0 | SHR |
| | SCALE MULTIPLIER VALUE LEFT. | | | | | | | | | | | | | | |
| 11000 | <R●SA> | + | <RPM> | + RD → R●SA | M6&UE | 0 | 0 | 1 | 0 | 0 | 1 | 1 | 1 | 0 | LHR |
| 11001 | <R●SA> | + | ¬<RPH> | + 1 → R●SA | M6&UE | 0 | 0 | 0 | 1 | 1 | 1 | 0 | 1 | 0 | PNMOP |
| 11010 | <R●SA> | + | <RPL> | + MY → R●SA | M6&UE | 0 | 0 | 1 | 0 | 0 | 0 | 1 | 1 | 0 | AHR |
| 11011 | <R●SA> | + | <RPL> | + ¬MY → R●SA | M6&UE | 0 | 0 | 1 | 0 | 0 | 0 | 1 | 1 | 0 | SHR |
| 11100 | <R●SA> | + | <RPM> | + RD → R●SA | M6&UE | 0 | 0 | 1 | 0 | 0 | 0 | 1 | 1 | 0 | AHR |
| 11101 | <R●SA> | + | ¬<RPM> | + ¬RD → R●SA | M6&UE | 0 | 0 | 1 | 0 | 0 | 0 | 1 | 1 | 0 | SHR |
| 11110 | <R●SA> | + | <RPH> | + AY → R●SA | M6&UE | 0 | 0 | 1 | 0 | 0 | 0 | 1 | 0 | 0 | AHR |
| 11111 | <R●SA> | + | ¬<RPH> | + AY → R●SA | M6&UE | 0 | 0 | 1 | 0 | 0 | 0 | 1 | 1 | 0 | SHR |

DEFAULTED CONTROL ABBREVIATIONS (1 = ACTIVE).
RXC — RXC MULTIPLIER VALUE (RX) SCALING CONTROL (SEE FIG. 6A).
LPH — LOW MULTIPLIER PIPELINE CLOCK INHIBITED.
UE — UNLOCK ENABLED.
II — INTERRUPT SERVICE INHIBITED.
SI — STACK WRITE-BACK INHIBITED.
AI — "A" ALU INPUT INHIBITED.
CIE — ALU CARRY-IN SELECTOR ENABLED.
ME — MULTIPLIER PIPELINE CLOCKING ENABLED.
RE — EXTENDED REGISTER SELECTION ENABLED.

EXPLANATORY NOTE:

COMPOUND INSTRUCTIONS (OPCODE 1XXX) DO NOT HAVE INDIVIDUAL CONTROL BITS LIKE THE COMPUTE INSTRUCTION (OPCODE 0111). INSTEAD, SPECIFIC CONTROL BIT SETTINGS ARE IMPLIED BY EACH CONTROL (FUN) CODE AS INDICATED ABOVE IN THE RIGHT COLUMNS. ACTIONS OF THE VARIOUS INDIVIDUAL CONTROL BITS ARE INDICATED IN FIGS. 6A, 6B, 6C, AND 6D.

FIG. 23

TABLE 6
SUMMARY OF INTERRUPT AND RESET
ENTRY ADDRESSES

| INTERRUPT OR RESET ADDRESS | IAR BITS 0 1 2 3 4 5 6 7 8 9 0 1 2 3 4 5 | INSTRUCTION FLOW CHANGE INITIATED BY: |
|---|---|---|
| POWR ENTRY ADDRESS (HEX 0000) | 0 0 0 0 0 0 0 0 0 0 0 0 0 0 0 0<br>0 0 0 0 0 0 0 0 0 0 0 X X X X X<br>0 0 0 0 0 0 0 0 0 0 0 1 1 1 1 1 | POWR SIGNAL ON INTERFACE PIN. |
| PROR ENTRY ADDRESS (HEX 0020) | 0 0 0 0 0 0 0 0 0 0 1 0 0 0 0 0<br>0 0 0 0 0 0 0 0 0 0 1 X X X X X<br>0 0 0 0 0 0 0 0 0 0 1 1 1 1 1 1 | PARITY CHECK OR OVERFLOW (UNDER MCRL CONTROL). |
| INT7 ENTRY ADDRESS (HEX 0040) | 0 0 0 0 0 0 0 0 0 1 0 0 0 0 0 0<br>0 0 0 0 0 0 0 0 0 1 0 X X X X X<br>0 0 0 0 0 0 0 0 0 1 0 1 1 1 1 1 | LOWEST PRIORITY INTERRUPT SIGNAL (LEVEL 7). |
| INT6 ENTRY ADDRESS (HEX 0060) | 0 0 0 0 0 0 0 0 0 1 1 0 0 0 0 0<br>0 0 0 0 0 0 0 0 0 1 1 X X X X X<br>0 0 0 0 0 0 0 0 0 1 1 1 1 1 1 1 | INTERRUPT SIGNAL (LEVEL 6). |
| INT5 ENTRY ADDRESS (HEX 0080) | 0 0 0 0 0 0 0 0 1 0 0 0 0 0 0 0<br>0 0 0 0 0 0 0 0 1 0 0 X X X X X<br>0 0 0 0 0 0 0 0 1 0 0 1 1 1 1 1 | INTERRUPT SIGNAL (LEVEL 5). |
| INT4 ENTRY ADDRESS (HEX 00A0) | 0 0 0 0 0 0 0 0 1 0 1 0 0 0 0 0<br>0 0 0 0 0 0 0 0 1 0 1 X X X X X<br>0 0 0 0 0 0 0 0 1 0 1 1 1 1 1 1 | INTERRUPT SIGNAL (LEVEL 4). |
| INT3 ENTRY ADDRESS (HEX 00C0) | 0 0 0 0 0 0 0 0 1 1 0 0 0 0 0 0<br>0 0 0 0 0 0 0 0 1 1 0 X X X X X<br>0 0 0 0 0 0 0 0 1 1 0 1 1 1 1 1 | INTERRUPT SIGNAL (LEVEL 3). |
| INT2 ENTRY ADDRESS (HEX 00E0) | 0 0 0 0 0 0 0 0 1 1 1 0 0 0 0 0<br>0 0 0 0 0 0 0 0 1 1 1 X X X X X<br>0 0 0 0 0 0 0 0 1 1 1 1 1 1 1 1 | INTERRUPT SIGNAL (LEVEL 2). |
| INT1 ENTRY ADDRESS (HEX 0100) | 0 0 0 0 0 0 0 1 0 0 0 0 0 0 0 0<br>0 0 0 0 0 0 0 1 0 0 0 X X X X X<br>0 0 0 0 0 0 0 1 0 0 0 1 1 1 1 1 | INTERRUPT SIGNAL (LEVEL 1). |
| INT0 ENTRY ADDRESS (HEX 0120) | 0 0 0 0 0 0 0 1 0 0 1 0 0 0 0 0<br>X X X X X X X X X X X X X X X X | INTERRUPT SIGNAL (LEVEL 0). |

THREE PHASED PIPELINED SIGNAL PROCESSOR

FIELD OF THE INVENTION

This invention relates generally to data processing systems and more particularly to digital signal processing computers adapted for performing the rapid, repetitive calculations for Fourier transformations, digital filters, compression coding and the like.

PRIOR ART

A variety of high speed signal processors exist in the known prior art; for example, see U.S. Pat. No. 4,041,461 that illustrates one such design. This design is a general purpose high speed processor that is capable not only of performing signal processing algorithms, but is also capable of doing post processing and display formatting functions. The processor is designed as a pipelined architecture and uses a separate storage controller connected with bulk store and with the working store nnd the arithmetic element control store. The addition of the extra control processor in addition to the arithmetic processor is a fine attribute but may require more space and complexity than can conveniently be fitted onto a single circuit chip. It also raises cost and interconnection complexity to an undesirable degree.

Yet another prior patent is U.S. Pat. No. 4,438,488 in which the data processing system has a slave computer connected to a host CPU and a host marin memory with the two computers being interfaced through direct memory access of the host main memory. The use of two separate computers is not conducive to signal processing under numerous instances where direct processing at the source of the signal is desired.

Yet another prior patent is U.S. Pat. No. 4,393,468 in which a plurality of parallel pipelined processors and specifically five independently programmable subsystems are designed for simultaneous operation. The additional complexity and cost make it a less desirable design in spite of the fact that it can be integrated on a single chip of semiconductive material. The five simultaneous allowable functions do not lend themselves to an interrupt driven machine with the more general purpose and programmably controllable functions associated with interrupt driven machines.

Yet another prior art patent is U.S. Pat. No. 4,270,181 in which separate pipelines are architecturally included comprising a main pipeline for performing the sequence of operations upon data other than conditional data and a second pipeline for processing conditional data with the two pipelines operating in synchronism.

Finally, U.S. Pat. No. 4,025,771 illustrates another type of pipelining architecture in which the control of overlapping instruction execution in an arithmetic unit is provided by stepping a sequence of instructions through a plurality of registers that are connected in cascade and by separately decoding each instruction in a register for control of the corresponding stage in one or more data processing paths. Each stage apparently has a single register in the controlled pipeline and there is a separate decoding register for each stage. This facilitates highly iterative and structured operations on blocks or arrays of data but does not lend itself easily to an interrupt driven machine or to the simplification and reduction in cost that are so desirable.

The basic concepts of serially coupled control levels, each of the control levels being coupled to a corresponding processing level is also shown in U.S. Pat. No. 3,875,391, which includes a programmable arithmetic controller and a pipelined arithmetic unit controlled by the controller. Again, the two separate controllers, i.e., the arithmetic controller and the processing controller are a level of complication that does not facilitate interrupt processing machines.

OBJECTS OF THE INVENTION

In view of the foregoing shortcomings with the known prior art, it is an object of this invention to provide an improved signal processor in which a single device is capable of controlling the full pipelined instruction and data flow in an interrupt driven mode.

Yet another object of the invention is to provide an improved pipelined signal processor in which an interrupt control logic is incorporated with an interlock for restoring the machine to execution of the address of the instruction being processed at the time the interrupt occurred.

Yet another object of the invention is to provide an improved interrupt driven phased pipelined signal processor in which a means is provided for recovering from errors arising in compound instructions that would ordinarily leave the machine without a proper record of the actual instruction being executed at the time the error occurred.

The foregoing and still other objects of the invention not specifically enumerated are met in a preferred embodiment of the invention briefly described in the following summary.

BRIEF DESCRIPTION OF THE DRAWINGS

FIG. 1 which includes FIGS. 1A and 1B illustrate an overall structural schematic diagram of the data flow elements and paths for the improved signal processor of a preferred embodiment of the invention.

FIG. 4B illustrates the instruction format for the indirect program access reading variation of the branch control format.

FIG. 4C illustrates the indirect program access writing variation of the branch control format.

FIG. 7 illustrates the instruction format for compound instructions of store and compute and for load and compute.

FIG. 8A illustrates the state of the machine control register high bits.

FIG. 8B illustrates the state of the machine control register low bits.

FIG. 9A illustrates the machine status register high bits.

FIG. 10B illustrates the high and low product partitioning control format.

FIG. 13 illustrates the linear extended address operation for direct branches and loading of the index register.

FIG. 15 illustrates the interface read/write control bit assignment and actions controlled thereby.

FIG. 16 illustrates a summary of the instruction formats as utilized in the preferred embodiment.

FIG. 17 illustrates the instruction decoding and execute actions for the various operation codes 0 through 7 (hex).

FIG. 18 illustrates the instruction decoding and execute actions for the opcodes 8 through F (hex).

FIG. 19 illustrates a summary of the index control actions for the opcodes 0 through F (hex).

FIG. 20 illustrates a summary of the branch conditional select codes and their action.

FIG. 21 illustrates the general arithmetic ALU function control codes as utilized in the preferred embodiment of the invention.

FIG. 22 illustrates a summary of the ALU function control codes with their implicit product register access meanings.

FIG. 23 is a summary of the interrupt and reset entry addresses as utilized in tee preferred embodiment.

SUMMARY OF THE INVENTION

Figure 2A:
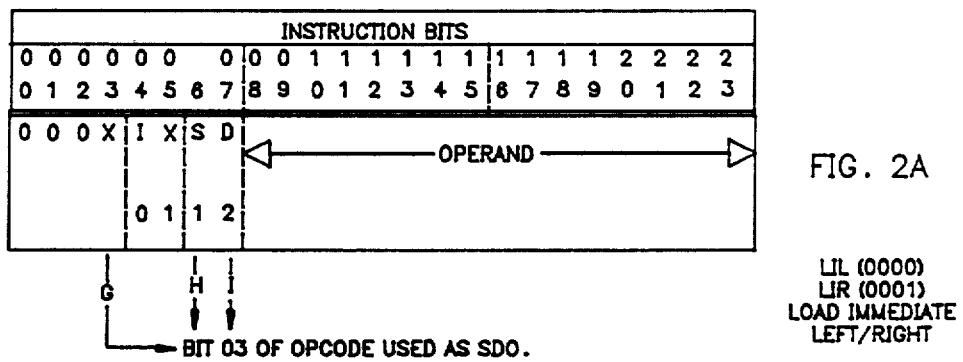
FIG. 2A illustrates the instruction bit format utilized for load immediate left and right instructions.

The signal processor is a specific single chip implementation of a new architecture adapted for numerous, repetitive signal processing functions. The device is, essentially, a fast new, single chip microprocessor with architectural features that enable it to expeditiously handle certain tasks commonly associated with signal processing. Sequential multiply-accumulate operations, in particular, can be accomplished very efficiently.

The architecture and instruction set of the processor are designed in such a way that the processor is able to efficiently accomplish typical signal processing tasks, such as filtering and correlation, as well as the more conventional housekeeping and arithmetic tasks. A subset of the instruction set used lends itself particularly well to signal processing related tasks (the "compound" instructions mentioned) below while the other instructions, the more familiar ones, tend to be more general purpose in nature.

To provide these improvements, the preferred embodiment of the invention is a processor that is pipelined in two areas: Instructions, in general, pass through a three-phase pipeline (fetch, decode and execute) and the multiplier utilizes a two-phase pipeline. The data flow is parallel and of sixteen bits width throughout. The instruction store is separate from data store. Provision is made, however, for the processor to read and write its own instruction store via two indirect program acces (IPA) instructions, IPA Read and IPA Write. Some instructions for this device cause multiple execute actions to occur. These "prrallel" or "compound" instructions can, for example, instigate a simultaneous transfer action (storage or I/O to or from stack) and compute action in separate regions of the data flow. Thus, a load (or store) and compute operation can be specified in a single compound instruction.

The arithmetic facilities of the processor include both a multiplier and a full ALU. Products produced by the multiplier may be selected as ALU input operands so that summing products into an accumulator is a very efficient process.

The machine is designed to be interrupt-driven. Its interrupt structure is designed to permit maximum flexibility but to be implemented with a minimum amount of hardware. Two direct memory access (DMA) modes are permitted in the design. In "Stop mode" DMA, the processor is requested to stop and relinquish both its instruction store and data store interfaces to an external device. In "Cycle Steal" DMA mode, the processor provides an interface signal to indicate when it does not require the data memory. This allows an external device access to the data memory during otherwise unused memory cycles.

The processor has extensive diagnostic capabilities whic can be invoked by the user via the machine control register (MCR). Included are parity checking on instruction and data memories and I/O transfers and overflow detection on ALU and multiplier operations. Diagnostic capability is expanded by instruction link control (ILC) which ensures error traceability within the pipeline flow. Status registers in the processor contain up-to-date information concerning ALU conditions, interrupt status and machine ceecks such as parity errors and arithmetic overflows. Because the processor can read and write its own instruction store using indirect program access (IPA) read/write instructions, its own resources can be utilized to acquire application programs from a host (local or remote) and place them in program store for execution.

DESCRIPTION OF THE PREFERRED EMBODIMENT

As depicted schematically in FIG. 1, the overall structure of the processor can be thought of as being divided into two general areas: the main data flow, and the sequencing and control logic. Main data flow will be considered to include the various data handling and manipulating elements. This comprises that portion of the block diagram FIG. 1B. The sequencing and control logic, which includes the instruction address register (IAR), instruction decode register (IDR), address generate (ADD GEN) adder with its associated common address bus register (CABR) and index register select path, and the instruction decode logic, makes up most of FIG. 1A.

Glossary of Abbreviations

The following text and, to a greater extent, the figures and tables that are included use many special names and abbreviations. These are summarized here for convenience.

Hardware Terms and Abbreviations

BUSSES:
CDB = Common tri-state data bus.
BMUX BUS = ALU 'B' side addend selection bus.
CMUX BUS = Stack 'C' output, MCR, PSR selection bus.
LMUX BUS = Input selection bus for left 4-register stack group.
RMUX BUS = Input selection bus for right 4-register stack group.
IAB = Address bus providing instruction address to program storage.
CAB = Common address bus providing RAM and I/O addresses.
REGISTERS:
R0 through R3 = Stack registers of the 'left' group.
R4 through R7 = Stack registers of the 'right' group.
MCRH = 16 high machine control register bits (see FIG. 8A).
MCRL = 16 low machine control register bits (see FIG. 8B).
PSRH = 16 high machine status register bits (see FIG. 9A).
PSRL = 16 low machine status register bits (see FIG. 9B).
IDR = Instruction decode register.
EXR = Instruction execute register.
CABR = Holding register for computed address or immediate operand destined for RAM, I/O or CDB.
IAR = Instruction address register.
ILR = Holding register retaining return address during interrupt processing.
IRWC = Interface read/write control register (see FIG. 15).
RPP = Partial product pipeline register (in multiplier).
RP = Product register (in multiplier).
Note: The three following "registers" are not physical registers but selected 16-bit segments of the product register, RP (see FIG. 10).
RPL = Low product value selected from RP.
RPM = Medium product value selected from RP.
RPH = High product value selected from RP.
OTHER HARDWARE ELEMENTS:
ADD GEN Adder = Adder used to form immediate operands, RAM addresses or I/O addresses.
ALU = Arithmetic logic unit.
RAM = Read/Write variable storage (16-bit words).

INSTRUCTION FORMAT TERMS

MISCELLANEOUS CONTROL FLAGS:
IX = Indexing control field (see FIG. 19).
FUN = ALU function control field (see Table 5).
Note: See FIG. 5 for usage of the following flag bits.
RXL = Multiplier ("X") value selector control flag.
LPH = Low product clock control flag.
UE = Unlock ALU condition enable flag.
II = Interrupt inhibit flag.
SI = ALU result-to-stack inhibit flag.
AI = ALU A input enable flag.
CIE = ALU carry-in enable flag.
ME = Multiplier cycle enable flag.

RE = Register selection extension flag.
STACK INPUT/OUTPUT SELECTION FIELDS:
SA = Stack 'A' output select field and ALU result destination selection "stack" to ALU "A" input; ALU output to stack).
SC = Stack output select field (stack to CMUX BUS).
SD = Stack load destination select field (CDB to stack).
BRACH CONTROL FIELDS:
BT = Branch type field (see FIGS. 5 and 6A–6D).
BCS = Branch condition select code (see FIG. 5 and FIG. 20).

MISCELLANEOUS CONVENTIONS AND TERMS

SYMBOLIC CONVENTIONS:
... = Contents of ...
( ... ) = Specified by ...
R@ ... = Register specified by ...
$|...|$ = Magnitude of ...
‾ = Logical NOT (bit inversion).

PREFERRED EMBODIMENT OF THE INVENTION

The main data flow consists of the "stack" register file 1, an AL 2, a multiplier 3, and the various busses that connect these elements. These elements will be individually described in the following sub-headed sections of this specification.

The Common Data Bus (CDB)

The main data flow of the processor is organized around a 16-bit common data bus 4 (CDB). The CDB serves to carry 16-bit data words between various elements of the signal processor and to/from external data memory and I/O.

The CDB is actually in too separate parts: the on-chip part and the off-chip part; the distinction is very much as the names imply. When data is moved on the CDB within the chip, the external part of the CDB is not activated. Thus, for example, if an immediate operand is moved from the common bus address holding register 5 to the register file 1 input via the internal CDB, the external CDB remains in a high-impedance state. The external part of the CDB (in addition to the internal part) is used whenever access to data storage (RAM) or memory-mapped I/O are required. Execution of instructions such as LOAD and STORE require that data be moved between the register file (on-chip) and data memory (RAM) or memory-mapped I/O.

Eighteen CDB signal lines (16 data bits plus 2 parity bits) are provided in the external CDB chip interface for the connection of RAM (data storage) and memory-mapped I/O (MMIO) devices. A simple memory configuration is indicated schematically in FIG. 1.

The C Multiplexed Bus (CMUX BUS)

The CMUX BUS 6 is a tri-state bus that provides a data path to move variables from the "C" output 7 of the register stack 1 or the MCR 8 or PSR 9 registers into the arithmetic logic (ALU 2 or multiplier 3) or onto the common data bus (CDB) 4.

The B Multiplexed Bus (BMUX BUS)

The BMUX BUS 10 provides the data path to the ALU 2 "B" input. Possible inputs to the BMUX BUS 10 are selected product segment from multiplier 3, CMUX BUS 6 contents or sign extension data (from bit 06 of PSRH 9).

Left Multiplexed Bus (LMUX BUS) and Right Multiplexed Bus (RMUX BUS)

The LMUX BUS 11 and RMUX BUS 12 provide data to the left and right input ports of the register stack 1. Inputs to these multiplexors came from the CDB 4 and the ALU 2 output. Note that data can be taken from the CDB 4 in both true and bytes-reversed form. The bytes-reversed path provides the means to implement the Load/Insert Byte (LIBY) instruciion.

The Register Stack

The Register "Stack" 1 is a random access file of eight, 16-bit registers, numbered R0 through R7, positioned in the arithmetic flow path. Three of the stack registers have specific assigned functions as shown below; the other five are general purpose registers.

R0—Stack register also used as an index register.
R4—Stack register also used as a second index register.
R5—Stack register also used to contain the current multiplier ("X") value.
R1, R2, R3, R6, R7—Stack registers with no specifically defined additional hardware function.

As shown in FIG. 1, the register stack has two input ports each of which provides an input path to a group of four registers. The register groups are referred to as the Left Group and Right Group throughout this specification. Note that stack inputs can come from the common data bus (CDB) 4 or the ALU 2 output (for a forced saturation value, in the case of overflow). One register in each four register group can simultaneously accept an input from one source.

The stack 1 is also provided with two output ports, each capable of accessing, simultaneously, one of the eight stack registers. One of these ports, the "A" port, provides data to the ALU 2 "A" input; the other, the "C" port 7, is attached to the CMUX BUS 6 via a tri-state driver 13. (There are a number of other tri-state drivers and, for simplicity, all are numbered 13 and the specific driver will be named in accordance with its input.)

Note that the index registers (R0 and R4) are directly wired to a multiplexor entering the address generate (ADD GEN) adder 14. Regiseer R5 is wired directly to the multiplier 3 "X" input and so always contains the number being used as a multiplier value. Multiplicands are supplied via the CMUX BUS 6 as will be described later.

The Multiplier

A multiplier logic 3 capable of multiplying 12-bit numbers by 16-bit numbers is provided in the processor. In this specification, the 12-bit number will be referred to as the "multiplier" value or "X"; the 16-bit number will be referred to as the "Multiplicand" value or "Y". Note that the high-order twelve bits (with or without rounding by the 13th high-order bit), low-order twelve bits or, if desired, the low-order four bits (with appended leading zeros) can be selected from the 16-bit R5 stack register as the 12-bit multiplier ("X") value. The multiplier logic is designed to handle two's-complement signed binary variables only.

The multiplier produces 28 product bits, numbered 0 through 27, which are partitioned into three selectable 16-bit product segments caleed High, Low and Medium (RPH, RPL and RPM). The actual bits comprising each segment will depend upon the way the multiplier value ("X") was scaled for the multiplication (as flagged by the MS bit in the multiplier pipeline), and upon the state of the Medium Product select control bit, MMM, in the machine control register 8 (MCRH bit 10).

Figure 10A:
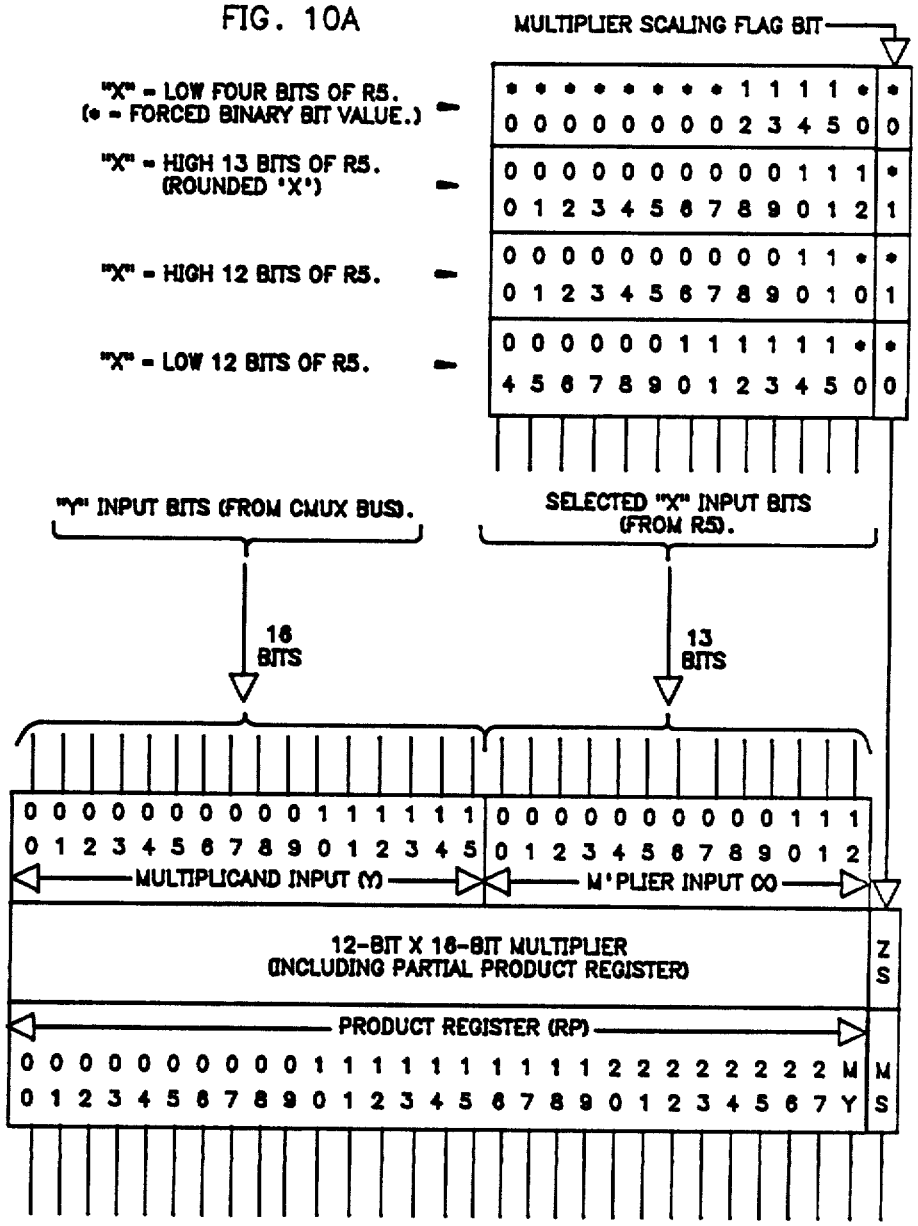
FIG. 10A illustrates the multiplier input scaling bit format.
Figure 10C:
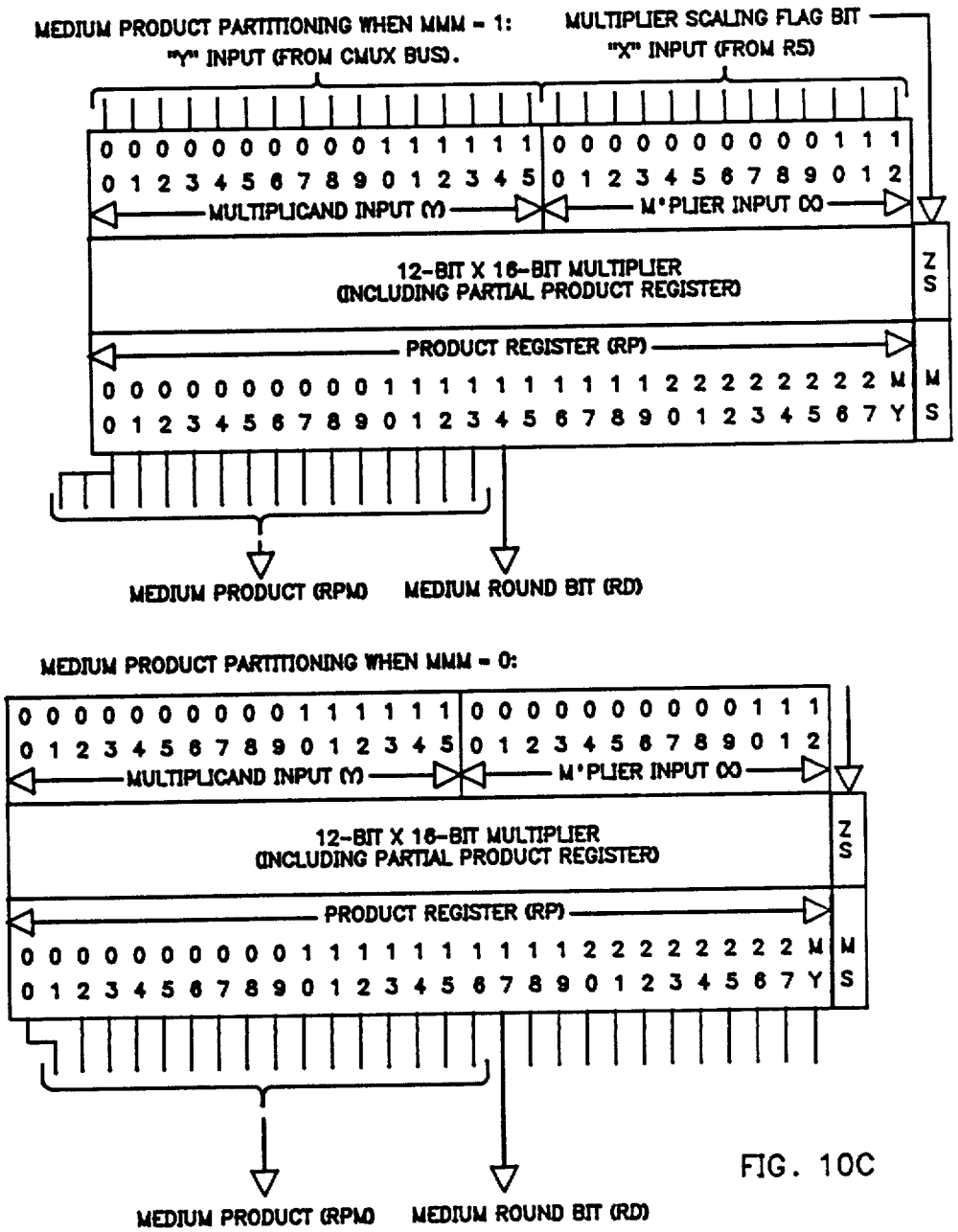
FIG. 10C illustrates the medium product partitioning format.

The actual bits included in each product segment under all the various conditions are uummarized in FIGS. 10 and 10C. FIG. 10A indicates the oour possible selection options for the multiplier value, "X".

The product segments can be selected individually as inputs to the "B" side of the ALU 2. Selection of the product segment is either implied by the ALU function control field (FUN) contained in an instruction (as in a Store and Compute instruction) or is explicitly specified (as in the variety of the Compute instruction summarized in FIG. 5C).

Operation of the multiplier is as follows. In general, all of the product bits produced by the multiplier logic appear simultaneously on the second cycle after the multiplicand value is selected. When compound (or parallel) instructions (opcode=1XXX) are executed in normal mode (MCRH bit 08=0), the entire multiplier pipeline, both product and partial product registers, moves whenever a multily function (function codes 1XXXX) is specified. The machine provides a second mode (MCRH bit 08=1) in which the registers of the multiplier pipeline are allowed to change only when the low product segment (RPL) is accessed. This arrangement allows some double precision multiply/accumulate computations to be programmed using one fewer stack registers. The Compute (C) instruction includes two specific bits to control product pipeline clocking: Bit 21, the "ME" bit, gives overall control of the product pipeline while bit 5, the "LPH" bit, permits partially inhibiting pipeline clocking so that previous partial product and pooduct information can be restored following an interrupt.

Multiplier Save-Restore on Interrupt

Figure 24:
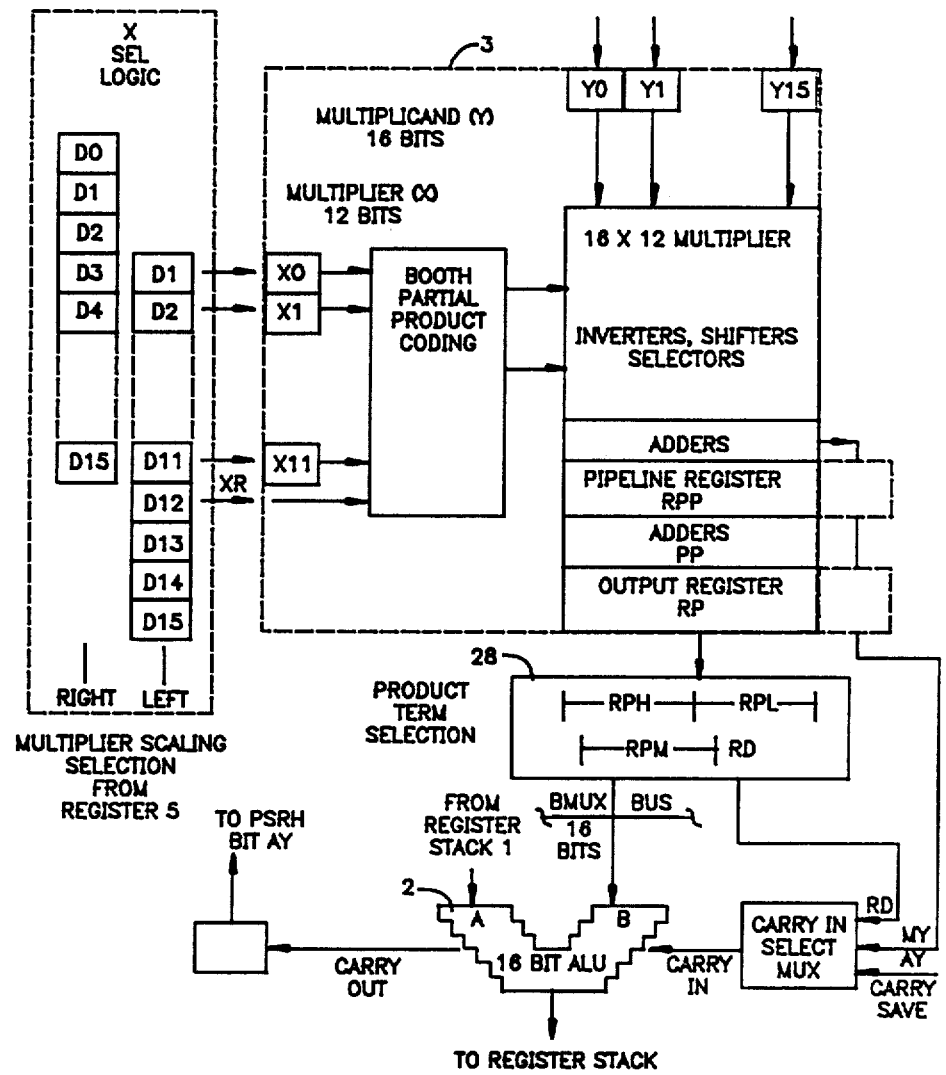
FIG. 24 illustrates in greater detail the multiplier and product save and restore logic utilized in the preferred embodiment.

In order to achieve performance, the multiplier 3 used in the processor employs an intermediate pipeline register in its circuit array. This is illustrated in FIG. 24. The contents of the pipeline register, RPP and the product register, RP, must be saved and restored when the processor is interrupted if the multiplier 3 is to be used during the interrupt routine. In addition, there are other factors which further define the state of the multiplier 3 operation such as the multiplier carry in MY and the MULTIPLIER (X) scaling information that must also be saved and restored on interrupt. Bits defining these factors are contained in the Program Status Register (PSR) 9. Saving and restoring the PSR 9 is done using standard instruction sequences. Saving and restoring the RP and RPP registers require special operations.

Saving RP and RPP

As noted in a previous section, the MULTIPLIER (X) input to the multiplier 3 can be selected from either the left 12 bits of the data flow or the right 12 bits. The selection, left or right, is defined by the multiplier mnemonic used in identifying the X input in the multiplier instruction as previously discussed. The selection is propagated thru the pipeline as the ZS bit in the PSR 9 and appears at the multiplier output as the MS bit (also in the PSR). MS is used to adjust the bit significance of the PRODUCT to reflect the MULTIPLIER (X) scaling specified. The ability to control the ZS directly by setting the PSR is key to the strategy for saving and restoring the contents of RPP and RP.

The contents of RP are saved by decomposing them into two terms: RP1 and RP2. RP1 is the low 16-bits of RP for RIGHT X scaling add RP2 is the high 16-bits of RP for LEFT X scaling. The scaling control is set by forcing the bit directly in the PSR 9. The low order 16-bits of RP are selected by right scaling and the high order 16-bits of RP are selected by left scaling.

When RPL is used to move RP1 to a register, no MY is used because MY will be restored directly when the PSR is restored. Once the above procedure is completed, the multiplier 3 is flushed to move the contents of RPP into RP and the procedure is repeated to save the previous contents of RPP and RPP1 and RPP2.

Restoring RP and RPP

The strategy for restoring the contents of the multiplier registers is to use the saved variables RP1, RPP1, RP2, and RPP2 as MULTIPLICANDS (Ys) with suitable variables as MULTPLIER (X)s to give the proper bit significance when the variables are combined. For example, the product RP is the result of RP1 ORed with RP2×2R12 (i.e., RP2 shifted to the left 12 bits).

Two problems arise in performing this operation. The first is when the low term RP1 is entered into the mmultiplier 3 (by multiplying by 1); it must remain fixed while the second product is formed. This problem is solved by a special multiply instruction, Multiply with low Hold (MHRD) the low product hold bit in the instruction. This is bit 5 of the compute instruction. This instruction degates the clock to the lower bits of the RPP and RP registers such that their contents remain fixed as the upper bits are filled wit the second product.

The second problem arises from the requirement of positioning RP2 12 bits up in the RP field. This is done by first doubling RP2 and then multiplying by $2^{11}$. This latter operation is accomplishdd by using a positive X (such as X'7FF8') which, when rounded to 12 bits, gives $2^{11}$. Note that such a value for X will not produce a MY carry to the ALU2. This is important since, as noted earlier, the value of the MY carries in the pipeline before interrupt will be restored when the PSR 9 is restored. The problem arises in the doubling of RP2. An overflow can occur which can result in a sign error. To avoid this, the carry AY (stored in the PSR) which is the sign of 2*RP is used to override the sign computed by the multiplier array. This is an additional function performed by the special instruction MHRD. To summarize, MHRD performs two operations key to restoring the multiplier register contents:

1. The bits which comprise the RPL field of RP (and equivalent bits for RPP with right scaling) will not be altered when the 13th or rounding bit from X selection is used to perform a multiplication.
2. The carry bit, AY, in the PSR 9 will be used to override the sign generation in the multiplier 3.

The ALU

Control of the function performed by the 16-bit ALU 2 is accomplished by the five-bit function control field (FUN field) of the instruction types Compute (C), Store and Compute (STC) and Load and Compute (LXC). The FUN field specifies the arithmetic or logical ALU operation to be performed and, to a certain extent, implies the ALU operands to be used. FIG. 21 summarizes possible ALU actions when a stack register is specified as the ALU "B" input. FIG. 22 shows the ALU actions when a product register is selected as the ALU "B" input.

The ALU 2 takes as its "A" input the contents of one of the eight stack registers 1 (or zero) and, as its "B" input, the contents of BMUX BUS 10. The ALU 2 output that results is then normally returned to the stack register 1 that provided the "A" input. In the Compute instruction (C) the SI bit (see FIG. 16) gives the ability to inhibit writing ALU results back into the stack. conditional branches are triggered by the results of computations occurring in the ALU.

The Machine Control and Status Registers

The High order and Low order Machine Control Registers 8 (MCRH and MCRL) each contain sixteen bits that individually control or modify specific machine functions. The High and Low order Machine Status Registers 9 (PSRH and PSRL) contain bits that reflect the current status of certain facets of machine operation.

Machine Control Register High (MCRH)

Twelve of the sixteen available bits in MCRH 8 have assigned functions; the remaining four (bits 0 through 3) are spare.

The control functions assigned to the MCRH bits, as summarized in FIG. 8A, fall into four general categories as follows.

Bits 4 and 5 of MCRH, the Instruction Link Control field (ILC), are used to enable special modes of operation whereby Instruction Link Register 15 (ILR) and Instruction Address Register 16 (IAR) clocking is inhibited when parity check or overflow occur following a branch. The purpose of these modes is to enable error tracing at the point of a branch; that is, when the ILR 15 could not normally be used to identify the point of failure.

Bits 6 and 7 of MCRH 8 comprise a Saturation Control mode select field (SCS). The purpose of these controls is to allow saturated arithmetic to be invoked for operations involving either stack or the product register operands. The FUN codes for which saturation can be invoked are indicated in Tables 5A and 5B.

MCRL 8 bits 8 through 12 are specific multiplier control bits. Their functions are defined in FIG. 7A.

Bits 13 through 15 of MCRL 8 comprise a select field defining the point at which carry will be inhibited within the Address Generate (ADD GEN) adder 14.

Note that when an instruction is read into the data flow of the machine using an IPA Read instruction, the high byte of the instruction read will be placed in MCRH 8 bits 8 through 15; the three instruction parity bits will go into MCRH 8 bits 5, 6 and 7. The path to accomplish this move is indicated in the main data flow schematic (FIG. 1).

Machine Control Register Low (MCRL)

The 16 bits of MCRL 8 (summarized in FIG. 8B) control five distinct functions as follows:

MCRL 8 bit 0 is a flag bit enabling selection of the Linear Extended Addressing Feature (LEAF). When the bit is on (bit=1), operation of the IRWC bits is modified to facilitate control of LEAF adapter logic external to the processor.

Bits 1 and 2 of MCRL 8 together provide a means of selecting the boundary between I/O and data memory addresses within the data address space of the processor. The position of an address relative to the boundary specified by the IOS setting will be reflected to the interface via the appropriate IRWC combination (see FIG. 15).

MCRL 8 bits 3, 4 and 5 individually allow parity checking to be inhibited on incoming instructions and data passing (via CDB) to or from the Data RAM or I/O.

MCRL 8 bits 6 and 7 are used to control whether a Processor Reset (PROR) is initiated when an ALU 2 or Multiplier 3 overflow occurs.

The last 8 bits of MCRL 8, bits 8 through 15, are used individually to inhibit service of interrupts on level 0 through 7, respectively. An interrupt pending on any level is serviced only if the corresponding service inhibit flag is reset (flag=0).

Machine Status Register High (PSRH)

The Machine Status Register High 9 contains 15 bits (one bit of PSRH 9, bit 5, is not assigned) that reflect, at any time, the state of certain portions of the logic as of the end of the last machine cycle. Specifically, PSRH 9 indicates the particular byte in which a parity check occurred, the conditions generated by the last ALU 2 operation, and the multiplier 3 ("X") scaling and product carry for the two previous products.

All the PSRH bits are summarized in FIG. 9A. From that summary note the following:

The state of parity checking for the three instruction bytes and the two CDB bytes are placed separately into PSRH 9. When a parity check occurs, it will be possible to determine from PSRH 9 which byte(s) failed.

Because the "X" value used in a multiplication is 12 bits selected from a 16-bit register (R5), a multiplier scale (MS) flag is propagated through bits 7 and 9 of PSRH 9 so that the resulting product can be properly interpreted. Bit 9 (ZS) is the partial product scale flag while bit 7 (MS) is the product scale flag.

PSRH 8 bits 8 and 10 contain uncompleted carry bits related to partial product formation. When the "low" product segment is selected as an operand in an ALU operation, MY will be selected as the ALU carry-in. The ALU will thus complete the low product when the product is used.

PSRH 8 bits 11 through 15 together with bit 6 contain information concerning the last ALU operation. PSRH 8 bit 6 (BS) contains the sign of the last ALU "B" operand, while bits 11 through 15 reflect the result of the last computation performed by the ALU 2 (latt result sign bit, last output =000 ... 0, etc.).

Machine Status Register Low (PSRL)

Figure 9B:
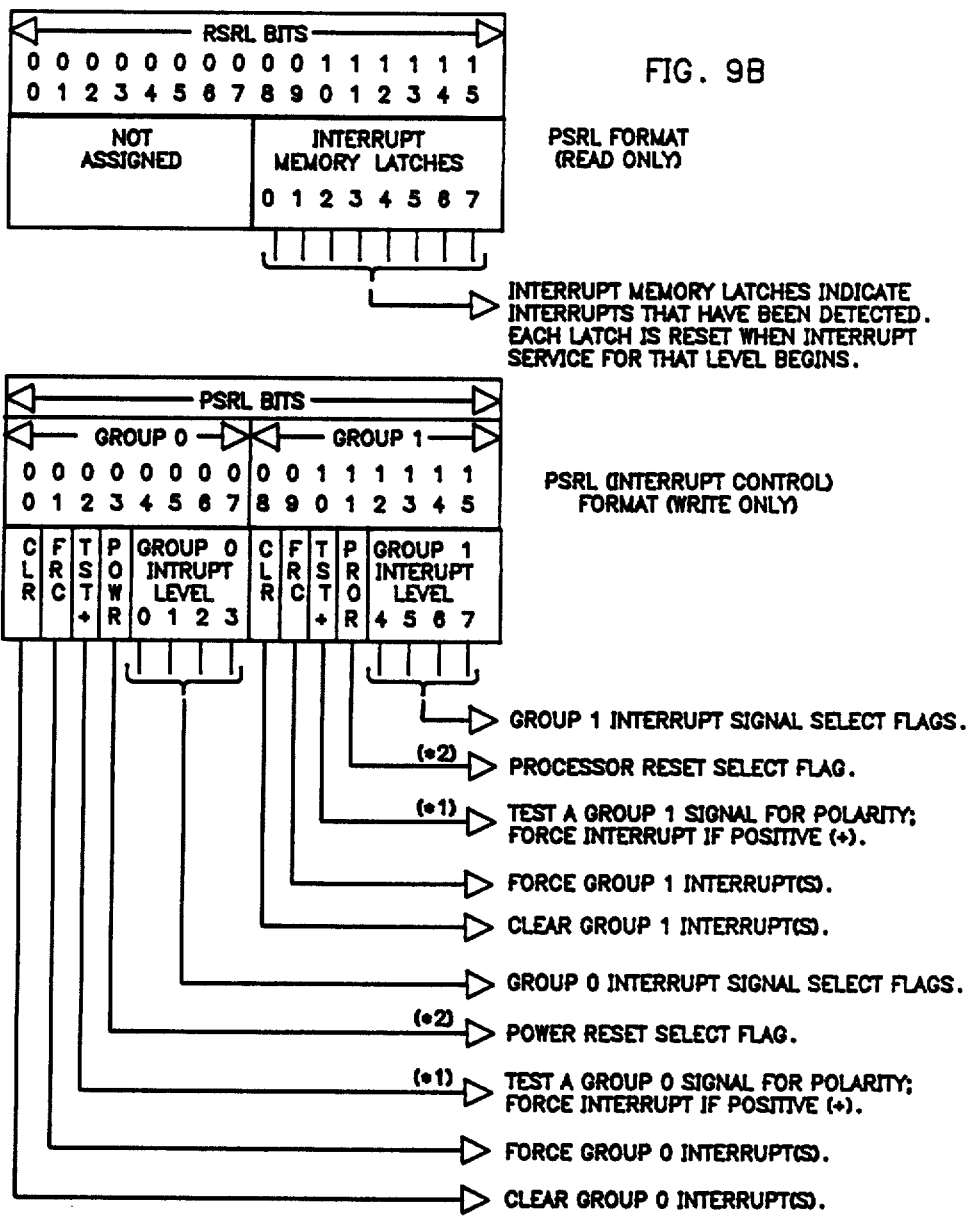
FIG. 9B illustrates the machine status register low bits.

As indicated in FIG. 9B, the meanings assigned to the PSRL 9 bits depend on whether PSRL 9 is being read or written (loaded). Actually, PSRL 9 can be considered to be an 8-bit register that can be read (its contents moved to a stack register) directly, but it can be loaded only through some fairly complex logic.

The 8-bit register that is called the PSRL 9 is actually the set of 8 interrupt memory latches. Each of these latches remembers that a particular interrupt signal was detected and will remain set normally until service for that signal begins. An interrupt latch is reset (normally) when the corresponding interrupt entry address is loaded into the Instruction Address Register 16 (IAR). Interrupt memory latches can also be forced to a set or reset state using a PSRL write instruction as outlined below. When PSRL 9 is read, it reflects the standing of all interruupts pending in hardware (others can be pending by programming).

When the PSRL 9 is "loaded" (written), what actually happens is that the contents of CDB 4 is accepted as an input to the interrupt control logic 17 and interpreted as indicated in the bottom of FIG. 8B. Note that the PSRL write format calls for the 16 bits to be considered as two 8-bit control bytes, one for each group of four interrupt signals. These two groups contain the controls for signals received on the two time-saared interrupt signal inputs 18.

Within each group cottrol byte, the last four bits serve as individual address bits; the first three bits represent commands that may be issued to one or more individuals in the group. Bits 3 and 11 of the PSRL write format enable "POWR" and "PROR" resets to be found. The three commands that can be issued are indicated by bits as follows:

The "CLR" (clear) bit causes the interrupt memory latches specified by the four address bits to be reset. Group 1 CLR used in conjunction with PROR causes the machine to exit from either a "Power" or "Processor" reset state.

The "FRC" (force) bit casses the interrupt memory latches specified by the four address bits to be set. The Group 0 and Group 1 FRC command bits respectively are also used in conjunction with POWR and PROR to initiate a "Power" or "Processor" reset condition.

The "TST+" (test interrupt signal polarity for a + level) signal causes the interrupt memory latches specified by the four address bits to be set if the interrupt signal polarity is positive. Note that when a TST+ command executes it can affect only the address being scanned by the interface scan clock at the time of execution. Since only one of the four interrupt signals is scanned at a time, it will be necessary to execute four consecutive TST+ commands (with the same single address bit set) in order to test the polarity of a single specific interrupt signal.

If more than one of the three command bits is set in the same group, the following will take place:

The CLR command bit will always cause a clear action regardless of what other commnd bits are set and the FRC command bit overrides a TST+ command.

Instruction Pipelining and Sequencing Control

The general term "sequencing and control logic" is used here to denote the logic used to sequentially access instructions, to cause branches and interrupts, and to decode and execute instructions that are accessed. In order to understand some of the complexities of sequencing, it is necessary to first understand something about instruction pipelining in the processor, so that will be discussed first.

The Instruction Pipeline

Figure 11:
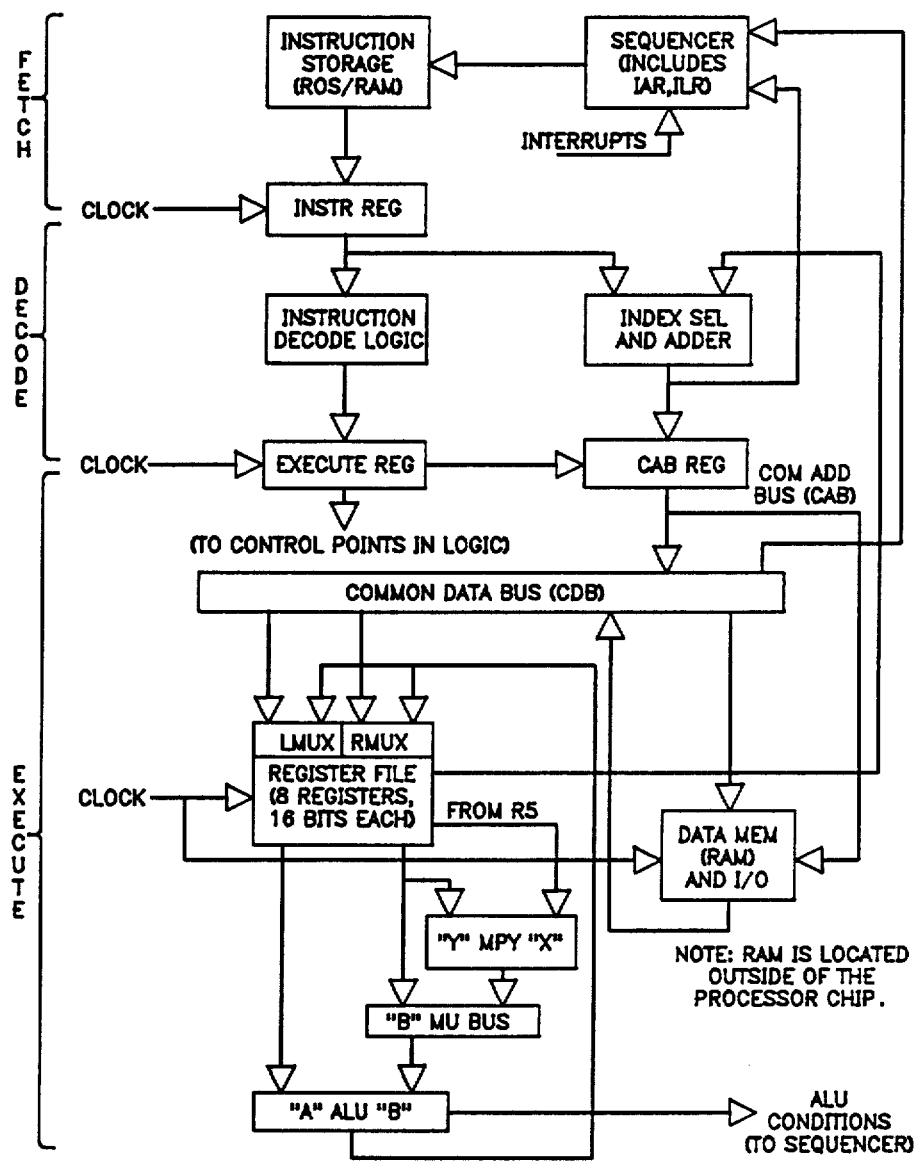
FIG. 11 illustrates schematically the instruction pipeline of data flow for the fetch decode and execute phases of the pipelined operation of the preferred embodiment of the invention.

The preferred embodiment utilizes a three-phase instruction pipeline (depicted schematically in FIG. 11). That is, at any given time, one instruction is being fetched from instruction store while the previously fetched instruction is being decoded for execution (and its associated operand or address, if any, is formed) and the previously decoded instruction is being executed. All instructions (except the Branch instructions, as will be seen) therefor require three machine clock cycles to fetch, decode and execute, although the execution rate is one instruction per machine cycle.

The architecture of the pipeline is such that an instruction being fetched is not "visible" to the control logic of the machine. An instruction first becomes visible only after it is placed in the Instruction Decode Register (IDR) 19 at the end of the fetch cycle. Each instruction fetched from program store 20 is first placed in the Instruction Decode Register (IDR) 19; a new instruction is loaded into IDR on each clock (rise) time.

Instructions in IDR are examined and decoded in decoder logic 21 during the machine cycle that follows and the results are loaded into the Execute Register 22 (EXR) at the next clock (rise) time.

Branches also require one machine cycle for instruction fetch and are decoded during the second machine cycle, but the IAR 16 is loaded with the branch-to address (assuming the branch is taken) at the end of the second cycle. No additional hardware action occurs normally on the third cycle of a Branch.

Address/Operand Formation

While an instruction in IDR 19 is being decoded in decoder 21, the operand portion of that instruction, if there is one, is operated on by the Address Generate (ADD GEN) adder 14. The inputs to this adder 14 are the operand bits selected from the particular instruction (in IDR) being decoded (as shown in FIG. 19) and the contents of the specified index register (R0, R4, or ILR) or a forced zero. The result of this addition is either used immediately, as in the case of the Branch instruction, or is loaded into the Common Address Bus Register (CABR) 5 at the same time the decode instruction associated with it is loaded into the Execute Register 22 (EXR). The contents of CABR 5 can then be gated to the CDB 4 during execution of the instruction in EXR 22 or the CABR 5 contents be used as an address, via the Common Address Bus 23 to access a RAM 24 location whose contents will be placed on CDB 4.

When the ADD GEN adder 14 is used to form an address, the addition can be forced to be circular on one of eight selected boundaries controlled by MCRH 8 bits 12, 14 and 15 (see FIG. 8A). This approach to implementing circular indexing involves selectively inhibiting carry propagation in the ADD GEN adder 14. Carry propagation can be inhibited at the following points as shown in the table below:

TABLE A

| MCRH Bits | | | | Resulting Modulo Address |
|---|---|---|---|---|
| 13 | 14 | 15 | Address Generator Action | Computation |
| 0 | 0 | 0 | No carry inhibit occurs. | — |
| 0 | 0 | 1 | Inhibit carry from bit 09 to bit 08. | 32 |
| 0 | 1 | 0 | Inhibit carry from bit 08 to bit 07. | 64 |
| 0 | 1 | 1 | Inhibit carry from bit 07 to bit 06. | 128 |
| 1 | 0 | 0 | Inhibit carry from bit 06 to bit 05. | 256 |
| 1 | 0 | 1 | Inhibit carry from bit 05 to bit 04. | 512 |
| 1 | 1 | 0 | Inhibit carry from bit 04 to bit 03. | 1024 |
| 1 | 1 | 1 | Inhibit carry from bit 03 to bit 02. | 2048 |

In all cases, the index control field of an instruction (IX) specifies the index action (see FIG. 19). The index control logic decodes IX and generates an appropriate carry inhibit signal. In addition, the logic causes the selection of the contents of R0, R4, the ILR register or zero as the addend to the operand value.

Instruction Sequencing Logic

In the preferred embodiment, the address of the instruction to be fetched is always contained in the Instruction Address Register (IAR) 16. As shown in the block diagram (FIG. 1), the IAR 16 has four selectable inputs to establish the next instruction address.

The output of a "+1" adder 25, that always produces an address equal to the last IAR 16 contents plus 1, is selected as the next IAR 16 input when the next sequential instruction is to be fetched from program store 20.

The output of the Address Generate (ADD GEN) Adder 14 is selected as the IAR 16 input when a direct branch is executed.

The contents of the Common Data Bus 4 (CDB) is selected as IAR 16 input when an indirect branch is executed.

When an interrupt service routine is initiated, the interrupt control logic 17 will provide the appropriate interrupt entry address to be placed into IAR 16. It also generates the correct entry addresses for "Power" and "Processor" reset routines.

In normal, non-branch, non-interrupt operation of the sequencer, the contents of the Instruction Address Register (IAR) 16 is placed on the Instruction Address Bus (IAB) where it is used by program storage 20 and simultaneously by the +1 adder 25. Then, while instruciion N is being fetched from program storage 20, a value N+1 is formed by the instruction counting (+1) adder 25. Finally, at clock time, when instruction N is loaded into the Instruction Decode Register (IDR) 19, the new instruction count value, N+1, is loaded into IAR 16.

In the case of a branch, the IAR 16 is loaded at clock time either with the CDB 4 contents or the output of the ADD GEN adder 14, the choice is controlled by whether the branch to be executed is of the direct or indirect type.

The Instruction Link Register 15 (LR) shown in the processor block diagaam (FIG. 1) takes its input from the IAR 16. This means that while the ILR 15 runs, it always contains the address of the last instruction fetched (the instruction in the IDR) 19. Note that the clock driving the ILR 25 is controlled to lock when the processor switches to the "foreground" state to service an interrupt. Thus, when an interrupt is serviced, the ILR 15 will stop, containing, as will be seen subsequently, an appropriate return address that can be used as a branch destination. Also, two varieties of the "long" branch instruction (see FIG. 5) cause the "foreground" state to be forced and the ILR 15 can be used to retain a return address under conditions other than interrupts. The ILR 15 will unlock whenever it is accessed as an index register.

The Interrupt Architecture

The interrupt logic of the preferred embodiment has been designed with two particular attributes in mind. First, the flexibility of user programming to implement a variety of interrupt structures is provided. If, for example, a six-level pyramidal interrupt structure is desired, it can be achieved by programming. Secondly, the total amount of logic required to implement interrupts was intended to be kept relatively small.

The Native Interrupt Structure and its Elements

The preferred embodiment implements a native interrupt structure comprising several parts that provide two interrupt levels called "background" and "foreground". Individual interrupts are triggered by externally generated signals and remembered in latches within the interrupt logic. Pending interrupts are serviced, if enabled, in order of priority (see FIG. 23). When interrupt service begins for any interrupt, the processing level switches from "background" to "foreground" and the IAR 16 is forced to an interrupt entry address commensurate with the interrupt level to be serviced. The instruction fetched just prior to taking an interrupt is forced to execute as ANOP to compensate for instruction pipeline effects. This is explained later.

Various sections of logic within the processor can be identified in FIG. 1 as supporting the native interrupt architecture. This include the following:

1. The Interrupt Memory Latches are implemented in PSRL 9 bits 08 through 15 to remember pending interrupts. When an interrupt is serviced, the latch corresponding to the level serviced is reset. Note that when an interrupt is pending at some level, no other interrupt at that level can be recognized.

2. The interrupt mask bits contained in MCRL 8 bits 08 through 15 serve to selectively inhibit individual pending interrupts. Any combination of the eight interrupt levels can be inhibited. The MCRL 8 bits can be set and reset at will by programming.

3. The interrupt control logic 17 causes an appropriate interrupt entry address to be inserted in the IAR 16 when an interrupt service is begun. This logic 17 also controls setting the "force NOP" flag latch (29 in FIG. 1) that causes the instruction just preceding the interrupt to execute as a NOP.

Native Interrupt Service Priority

Two multiplexed interrupt signal lines 18 are provided in the processor module interface logic 17 to conduct interrupt signals into the processor. Each of these lines 18 can carry up to four time-multiplexed interrupt signals. Interrupt signals are sampled onto the two interrupt input ports under control of a two-bit scan clock 22, ISCC0 and ISCC1.

Each of the eight possible interrupt signals and two resets has a specific fixed entry location in program storage 20 where task processing will begin when interrupt service in initiated. These entry addresses are arranged as shown in FIG. 23. Note from the table that the entry addresses for interrupts 1 through 7 and the two resets are distributed so that 32 [20 Hex]instructions are available to accomplish interrupt service processing for each level or for branching to more llaborate interrupt routines located elsewhere in instruction store 20. An interrupt service routine of arbitrary length can be located contiguous to the entry address of interrupt level 0 which is the highest priority interrupt.

Also note that the latches comprising PSRL 9 that remember interrupts pending are individually reset when the interrupt entry address is placed into the IAR 16.

Interrupt Signalling

An interrupt signal consists of a logical zero-to-one transition that is detected by comparing present and last samples of the multiplexed interrupt signals. When such a signal is detected a latch, which can be examined by reading the PSRL 9, is set to remember the event. If interrupt service is not inhibited by MCRL 8 for the particular interrupt that occurred, an interrupt initiation sequence can begin. Recall that MCRL bits 8 through 15 individually inhibit service for the interrupt signals 0 through 7 when set (=1). If an interrupt service in inhibited, the individual interrupt memory latch will remain set and will appear to the sequencing logic when the appropriate MCRL 8 bit is reset to enable service.

The interrupt memory latches can indicate one or more interrupts pending at a given time. When, in the course of events, an interrupt process is allowed to begin, the actual interuupt serviced will be determined by the inherent priority of the interrupts not masked off. In other words, when more than one interrupt is pending, the unmasked one with the highest priority will be serviced first while other lower priority requests will continue to be saved by hardware to be serviced later in order of priority.

A Synopsis of Native Interrupt Initiation Actions

Whenever the stream of instructions begin executed by the processor in the background state is to be suspended to service a pending interrupt, the following sequence of events takes place:

1. First, interrupt initiation cannot occur unless the instruction "visible" in the instruction decode register 19 (IDR) is not interrupt protected. Note that some instructions are always protected, some never protected, and some have selectable protection. FIG. 16 indicates which instructions are protected and generally how the protection is invoked.

2. If no protection is indicated for the instruction being decoded, and if an interrupt is pending, an interrupt entry address will be inserted into the instruction address register 16 (IAR). At the same time, the instruction previously fetched from program storage will be placed in the (IDR) 19. However, because the interrupt was allowed, a flag 29 is also set at this time which will cause the instruction loaded in IDR 19 to be ignored. That is, the instruction loaded into IDR 19 will be decoded in 21 and subsequently executed as NOP. The machine will not change states as a result of executing the NOP.

3. When an interrupt entry address is loaddd into the IAR 16, the corresponding interrupt memory latch is reset and the instruction link register (ILR) 15 content is changed to the address of the instruction just fetched, which is for the instruction that will not be executed. The ILR 15 is frozen at this point and will remain frozen until the address contained there is accessed. Thus, at the end of an interrupt service routine, it is possible to simply branch to the address specified by the ILR 15 contents to correctly resume normal instruction sequencing.

The ultimate effect of the preceding series of actions is that one additional instruction, a NOP, is executed each time an interrupt is serviced. The advantage of this scheme is that it eliminates any questions of how to handle a protected instruction fetched when an interrupt sequence is initiated, thus simplifying the interrupt protection requirements for this machine's instructions.

Some Possible Interrupt Alternatives

The native interrupt structure of the processor is flexible enough to allow users to implement a variety of interrupt handling schemes. Some examples are:

1. First, the native interrupt structure of the processor can be used very much as is. That is, when an interrupt occurs, it will first become pending and then be serviced in the normal way in order of the priority established by the native interrupt control logic. When interrupt service is initiated, the processor will switch to foreground state; after service is complete, a branch with level exit (BLEX) instruction will return control to the program that was interrupted (starting with the instruction originally replaced with a NOP) and switch the processor to background state.

2. In a simple variation of the normal native approach to servicing interrupts, interrupts, interrupt service may be deferred or stacked. In that approach, an interrupt is not truly serviced when initiated but the fact of its occurrence is saved (by software). In this scheme, the processor will remain in foreground state only briefly while the interrupt is stacked; then it will be returned to background in the usual way. Later, when it is convenient, stacked interrupts will be examined in background state and serviced in whatever order that the user desires.

3. A true interrupt is like an unplanned branch. The design of the native processor interrupt structure, however, allows the hardware actions normally performed by interrupt controls to be overridden and accomplished entirely by software. This can be accomplished by masking or inhibiting all interrupts and instead causing the state of interrupts pending to be examined periodically by reading PSRL 9. Interrupts found to be pending can be serviced in whatever order the user desires or can be stacked as desired. If this technique is used, the interrupt memory latches must also be reset by programming. This is possible using facilities provided by the instruction that writes PSRL 9.

The Instruction Set

In this section, the decode and execute actions of each instruction are outlined and the purpose of the various control fields in each instruction described.

Instruction Formats and Mnemonics

All machine instructions consist of 24 bits numbered 00 through 23. The first four bits (bits 00-03) of each instruction comprise a defining operation code (opcode that serves to specify the format and function of the instruction. Formats of all instruction types are summarized in FIG. 16. The decode and execute actions of each opcode are summarized in Table 2.

Note that the various tables and figures refer to instruction types by a set of mnemonics. These "hardware mnemnnics" are used here for convenience and should not be confused with software mnemonics used in writing assembler language programs.

The Index Control Field

Bits 4 and 5 of most instructions (see FIG. 16) contain the index control field (IX). This field serves both to select an index register value (the contents of R0, R4 or ILR) or zero (no index register selected) and to specify how that selected value is to be used to modify the operand contained in the instruction to form an address or immediate value. The meanings assigned to the IX field combinations depend upon the instruction opcode. FIG. 19 summarizes the IX field actions for all instruction types.

The value resulting from adding a selected index register to an instruction operand (in the ADD GEN adder 14) is placed in the Common Address Bus Register 5 (CABR) where it is sometimes used as an address and sometimes as an immediate operand. In general, the use of the CABR 5 contents as an address or an immediate operand is a function of the opcode. In the case of a Branch instruction type, the output of the ADD GEN adder 14 may be used as a direct branch-to address. If so, the ADD GEN adder 14 output is loaded into the IAR 16 as well as CABR 5.

Instruction Execute Actions

As indicated in Table 2, each instruction has either a transfer action, a compute action, or both. All instructions with a high-order opcode bit of 1 (the compound instructions) have both transfer and compute actions. The instruction execute actions and the formats of the various instruction types are discussed in the following:

The Load Immediate Instructions (LIL, LIR)

The LIL and LIR instructions (opcodes 0000 and 0001) will cause an immediate operand to be loaded into a register on the left or right side of the stack 1. The instruction format (see FIG. 3) contains a 2-bit index control field (IX), a 2-bit stack register destination field (SD) and a 16-bit operand field.

The IX field determines whether an index register 1 (R0 or R4), Instruction Link Register 15 (ILR) or zero is to be added to the 16-bit instruction operand field to form the immediate value. The result of that addition is loaded into CABR 5 at the end of the decode phase of the instruction. The contents of CABR 5 is then placed onto the CDB 4 during the execute phase and loaded into the appropriate destination register 1 on the clock pulse ending the execute phase.

The three-bit SD field determines the destination register (within the stack 1) of the immediate operand formed under control of the IX field. For the load immediate type of instruction, the SD 1 and 2 bits (instruction bits 6 and 7) are augmented by instruction bit 3 (SD0), normally an opcode bit, to yield the necessary three-bit destination register address. The bits SD1 and SD2 determine which of four registers on the left or right side of the stack 1 is the destination; bit SD0 selects the left or right register group.

The Load Instruction (L)

The format of the Load (L) instruction (opcode 0010) is similar to the "LI" (R or L) type instruction just described except that the operand field contains 15 bits rather than 16. Bit 23 of the instruction, the low-order operand bit in the LI format, is used as the high-order bit of the SD field (SD0) in the Load instruction, allowing complete specification of the destination register on the left or right side of the stack 1.

The operand of a Load instruction is used in the following way to form a RAM address: The 15 bits of the operand field and an appended zero (0) are added to the 16 bits of the selected index register (R0, R4 or zero as specified by the IX field) in a manner indicated in FIG. 3 and the result placed in CABR 5. This action takes place during the instruction decode phase.

Figure 2B:
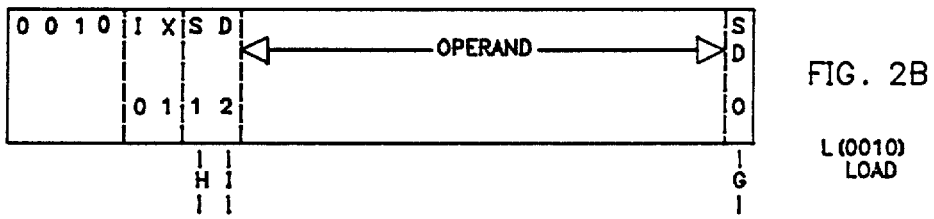
FIG. 2B illustrates the instruction bit format for the load instructions.

As indicated in FIG. 2B, the execute action of the Load instruction involves placing the contents of CABR 5 onto the Common Address Bus 4 (CAB) so that it can be used as an address, by either RAM 24 or memory mapped I/O (MMIO), rather than as an immediate operand. Data from this address is placed onto CDB 4 during the execute phase and loaded into the destination stack register (the SD field of the instruction specifies the register address) at the clock transition ending execution.

The Store Instruction (ST)

Figure 2C:
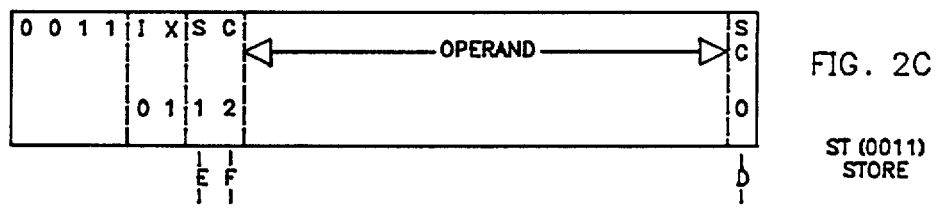
FIG. 2C illustrates the instruction bit format for the store instruction.

The Store instruction (opcode 0011) permits the contents of any stack 1 register to be moved into a specified RAM 24 location. As indicated in FIG. 2, the format of the instruction is very similar to the Load format. The difference is that the SD field of the Load becomes an SC field in the Store format. The SC field serves to select one of the eight stack 1 registers whose contents are to be stored.

The decode actions for a Store instruction are similar to thos for the Load: The contents of the 15-bit operand field and an appended zero (0) are added in the ADD GEN adder 14 to the index field specified by the IX bits in the instruction (see FIG. 5–FIG. 19) and the result placed in CAB 5 at the end of the decode phase.

During the execute phase, the contents of CABR 5 is placed on the Common Address Bus 4 (CAB) where it will be used as an address by either RAM 24 or an I/O device. The data to be stored is taken from the stack 1 register specified by the SC field of the instruction. The contents of the specified register is selected onto the CMUX BUS 6 and then passed, via a driver 13 (see FIG. 1), to the CDB 4. At the clock transition ending the execute phase, the CDB 4 contents is loaded into the destination address present on the Common Address Bus 23 CAB.

The Conditional Branch Instruction (BC)

Figure 4A:
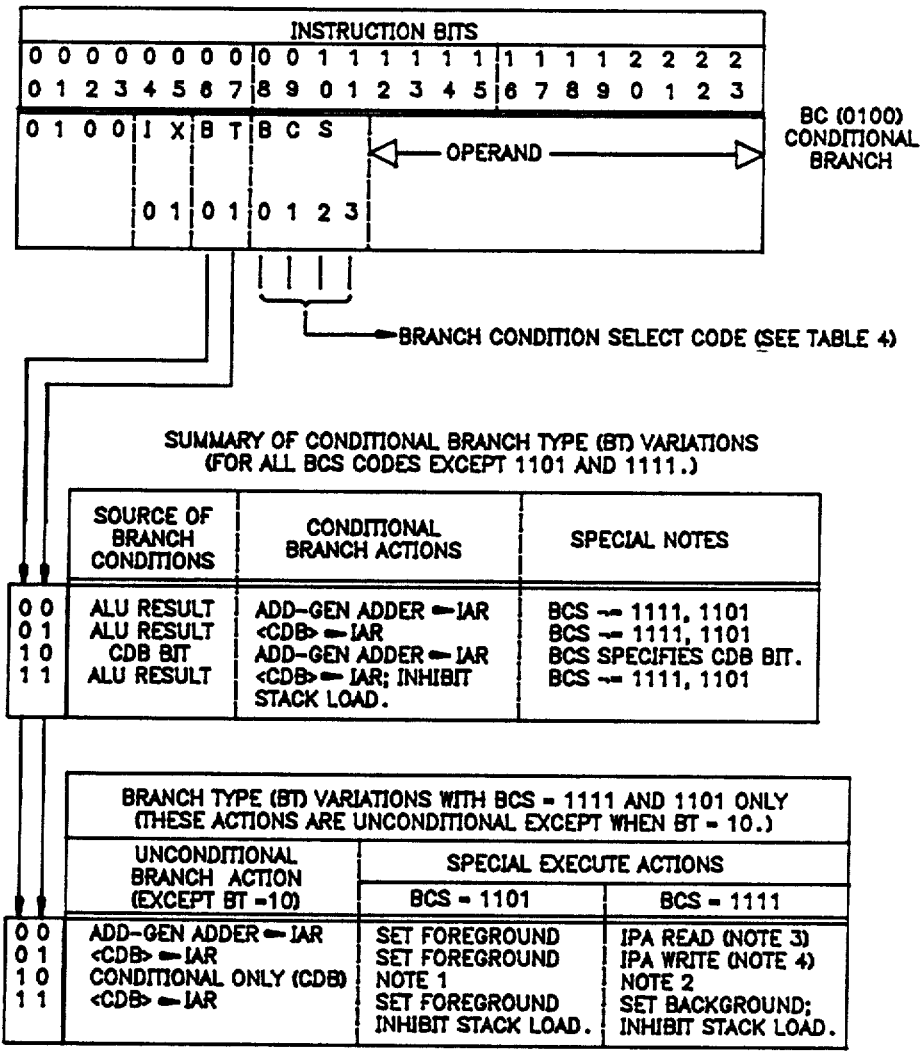
FIG. 4A illustrates the instruction bit format for conditional branch instructions.

The Conditional Branch instruction (opcode 0100) format has a 12 bit operand field as indicated in FIG. 4. The remaining 12 bits contain, in addition to the opcode, a 2-bit IX field, a 2-bit Branch Type (BT) field and a 4-bit Branch Condition Select (BCS) field. The index field (IX) control actions are summarized in FIG. 19, the BCS codes in FIG. 20, and Branch Types in FIG. 4A.

The Branch instruction, unlike all other types, executes at the end of what is the decode cycle for any other instruction. That is, the Branch can be described as being decoded during its second machine cycle and execute at the clock transition ending that cycle.

The various branch condition signals described in FIG. 19 are generated from ALU 2 conditions that prevail when the branch instruction executes or, in the case of Branch-on-Bit, on the state of an individual bit on the CDB. The decision to branch or not is based on "hot" conditions that exist within the machine during the second cycle of the branch, not on buffered conditions. Consequently, the branch condition used must be the result of an instruction that is in its third machine (execute) cycle at the same time the Branch is in its second cycle.

The execute action of the Conditional Branch can be either direct or indirect. For this machine, a direct branch is defined as loading the ADD GEN adder 14 output directly into the IAR 16, an indirect branch action is defined as loading the CDB 4 contents into the IAR 16. Of course, if the branch conditions specified by the BCS field of the instruction are not met, the next sequential instruction address will be loaded into IAR 16.

Since the execute action of a Branch occurs at the end of the second phase, there is a direct time overlap with an instruction that is executing (on its third phase). Thus, a compute action utilizing the ALU 2 (for example) may be occurring simultaneously with the branch execution and providing the hot branch conditions. In general, any conditional branch must be overlapped in this way to provide valid branch conditions because the branch conditions generated by the ALU 2 are only used directly. Also, if an indirect branch is desired (CDB 4 contents loaded into IAR 16) it is necessary to arrange to have a transfer action place the correct branch-to address on the CDB 4 while the branch is executing. The compound instructions (STC and LXCN) and the Compute (C) instruction are able to activate both the CDB 4 and the ALU 2 while the branch is executing (the Compute instruction causes CMUX Bus 6 contents to be placed on CDB 4 during execute time).

The Load/Insert Byte Instruction (LIBY)

The Load/Insert Byte Instruction is designed to permit the processor to accomplish some byte handling operations. Specifically, LIBY allows the high or low byte of the CDB 4 to be loaded into the high or low byte position of any of the eight stack 1 registers. The unaffected byte of the destination stack 1 register may be zeroed in the process or left unchanged.

Figure 3:
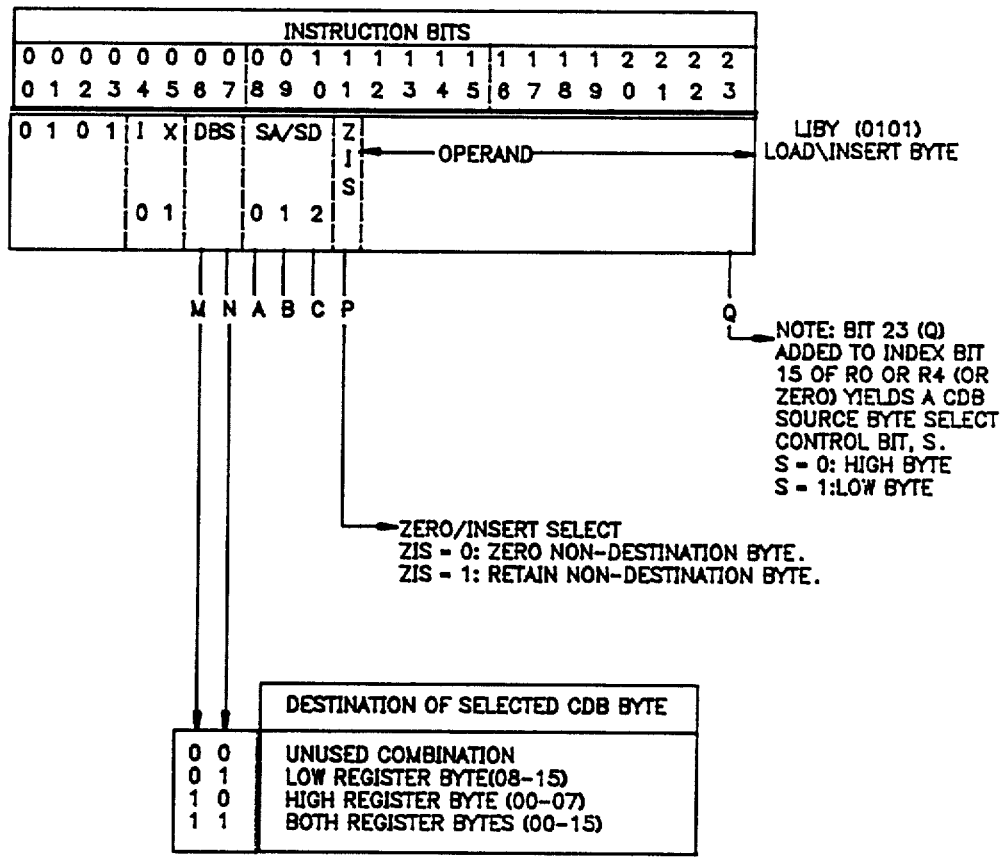
FIG. 3 illustrates the instruction bit format as utilized for the load/insert byte instuuction.

The format of LIBY, as indicated in FIG. 3, contains (in addition to the four-bit opcode) a two-bit IX field, a two-bit Destination Byte Select (DBS) field, a three-bit address field to specify the destination register, and a Zero/Insert Select (ZIS) flag bit. There is also a 12-bit operand field in an LIBY instruction. Options selected by the IX field are defined in FIG. 19. Actions defined by the DBS and ZIS bits are summarized in FIG. 3.

Actions that take place during the decode phase (second cycle) of the LIBY are the same as those of the ordinary Load except that address formation is somewhat different. In the case of the LIBY, 12 operand bits (with the high-order bit extended four places as shown in FIG. 19) are added to the index value specified by the IX field. The result of this addition will be loaded into CABR 5 at the end of the decode phase to be used as an address during the execute cycle. Actually, only the high-order 15 bits of CABR 5 will be used as a RAM 24 or I/O address while the low bit will be used to determine which byte of the CDB 4 will be gated to the destination register.

Execute actions that occur for a LIBY instruction are:

1. The contents of CABR 5 are gated to the Common Address Bus 23 (CAB) and used to address the desired RAM 24 or I/O data; the data accessed are placed on the Common Data Bus 4 (CDB).

2. The low-order bit of CABR 5 determines one byte of CDB 4 to be gated to the input of the register 1 specified by the 3-bit destination address field at the same time the present contents of that register are also selected via the "A" stack 1 output port and gated to the ALU 2. The ALU 2 will either flush its "A" input to its output or present an all zero output, depending on the state of the ZIS flag (bit 11) in the instruction.

3. One byte of the ALU 2 output, the one not taken from the CDB 4, will be gated to the same destination stack 1 register input as the byte from CDB 4. Thus, when the destination stack 1 register is clocked at the end of the execute cycle, 16 bits, half from CDB 4 and half from the ALU 2 output, will be loaded into it.

The Unconditional Long Branch Instruction (BLU)

Figure 5:
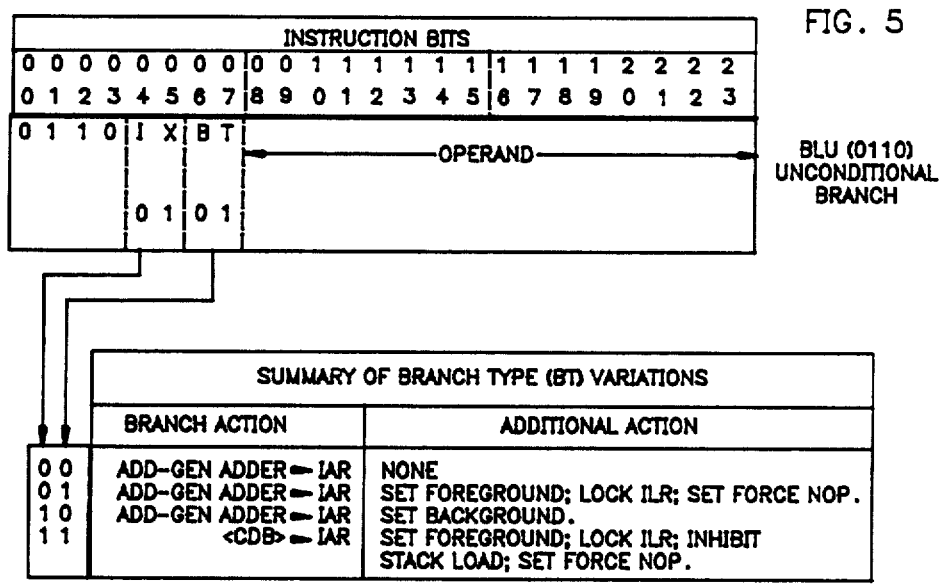
FIG. 5 illustrates the instruction format for the unconditional long branch instruction type.

The Unconditional Long Branch Instruction provides the processor with a means of branching immediately to any instruction within its native addressing range of 65536 instructions. To accomplish this, the format, as shown in FIG. 5, contains a 16-bit operand field. The BLU instruction type is for unconditional branching only.

From FIG. 5, the instruction format contains a two-bit IX field and a two-bit Branch Type (BT) field in addition to the opcode and operand fields. Index select (IX) options are indicated in FIG. 19; Branch Types (BT) are summarized in FIG. 5.

Like the conditional branch instruction (BC), the BLU instruction is decoded during its second machine cycle and executes at the occurrence of the clock transition ending that cycle.

The decode action of BLU involves resolving a branch-to address by adding the 16-bit operand of the instruction to the selected index register contents (or zero) as indicated in FIG. 19.

As in the Conditional Branch, either the ADD GEN adder 14 output or the CDB 4 can be selected to be loaded into the IAR 16 when the second (decode) cycle ends. Thus, the long branch may be either direct or indirect just as the conditional branch can; the determination of direct or indirect branching is controlled by the BT field of the instruction.

The Compute Instruction (C)

The Compute (C) instruction is used for general computation and has no transfer action associated with it. Because there is no transfer action, the Compute instruction needs no IX field or operand. The bits that would otherwise have been used for index control and an operand are utilized instead to control specific facets of the arithmetic operation to be performed. The various control bits of the instruction, and the options they allow, are summarized in FIGS. 6A, 6B, 6C and 6D. Use of these "individual control bits" is further detailed in the following discussion of the instruction format.

Figure 6A:
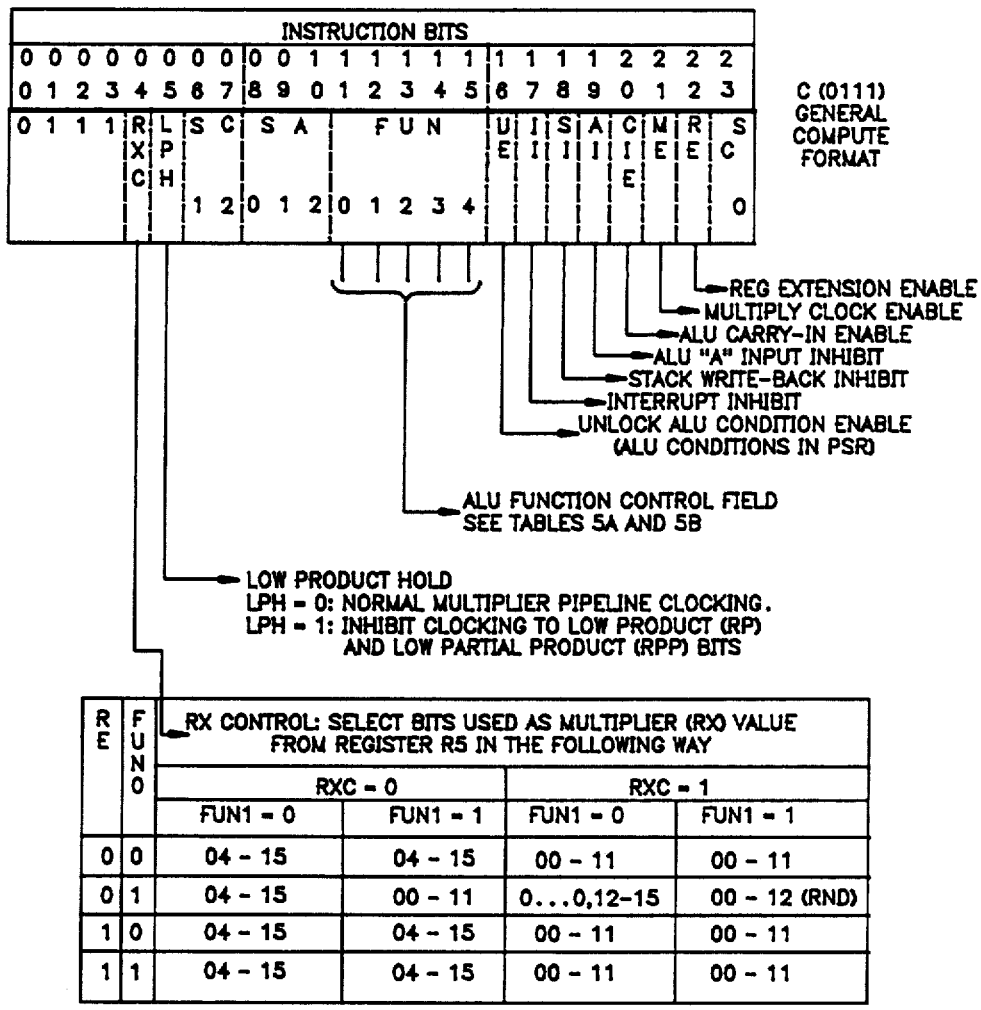
FIG. 6A illustrates the instruction format for the general compute instructions.

The "X" select control bit (bit 4), the RXC bit as indicated in FIG. 6A, is used in conjunction with the RE, FUN0 and FUN1 bits (bits 22, 11 and 12) to control the scaling selection of a multiplier 3 ("X") value from stack 1 register R5. The details of "X" scale selection are indicated in the table on FIG. 6A.

Bit 5 of the Compute instruction allows the clocking to the low-order 16 product bits and corresponding partial product bits to be selectively inhibited even though multiplier clocking is generally enabled by the ME bit (bit 21) being on. This control is used when restoring previously saved products and partial products to the multiplier 3 pipeline.

Instruction bits 6, 7 and 23 together comprise the SC field. This field serves primarily to address the register whose contents are to be gated onto the CMUX BUS 6. When the RE bit (bit 22) is on, the SC field is used to select product register segments (see FIG. 6C) or MCR 8 or PSR 9 contents (see FIG. 6D) to be placed on CMUX BUS 6.

Bits 8, 9 and 10 of the Compute instruction comprise the SA field. This field is used to address the register whose contents will be passed to the ALU "A" input. It also serves to specify the destination of the ALU 2 output when that output is to be written back into the stack 1.

Figure 6B:
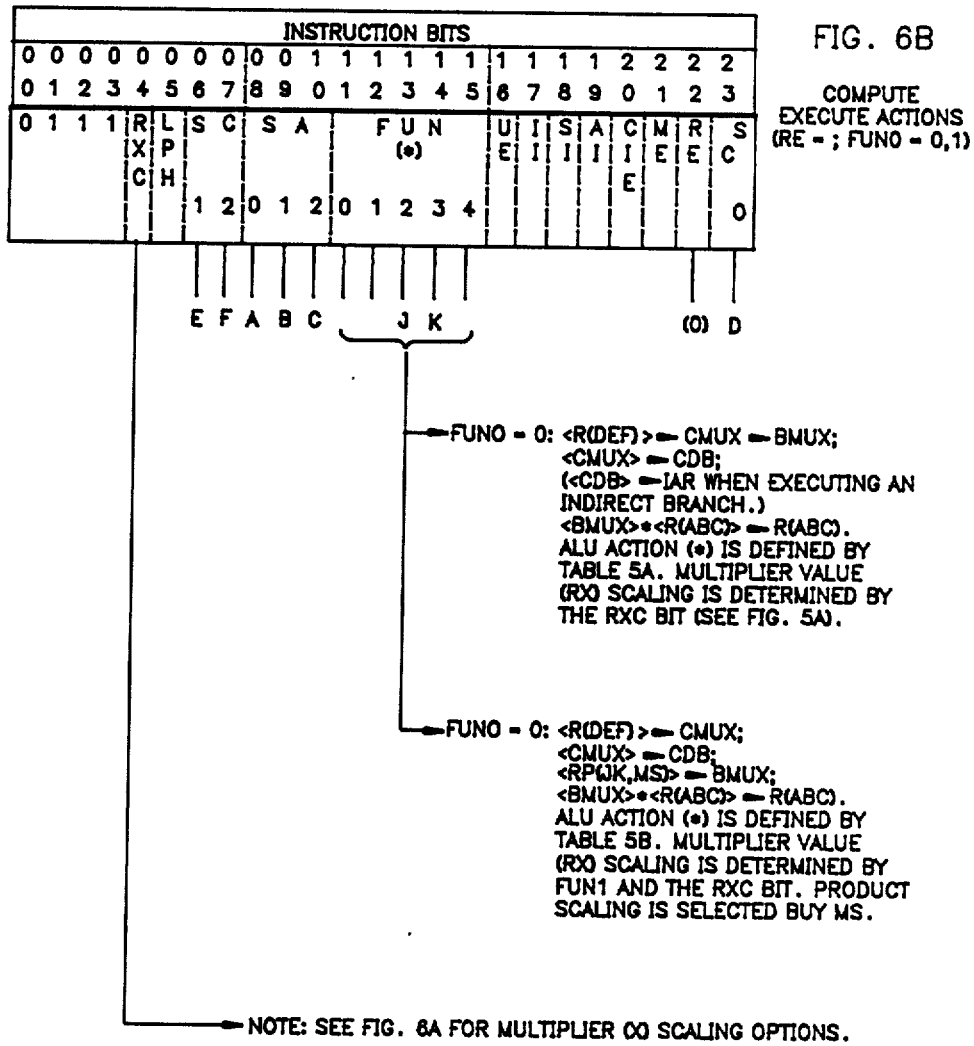
FIG. 6B illustrates additional compute instruction formats.
Figure 6C:
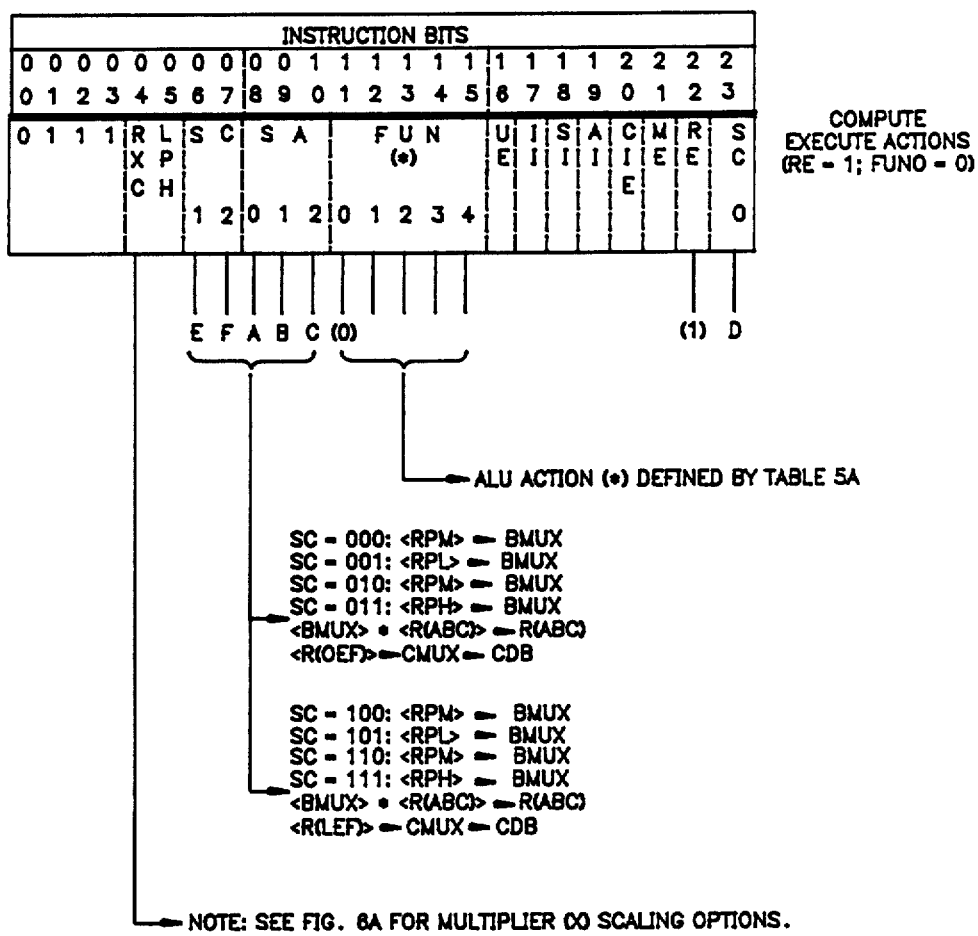
FIG. 6C illustrates additional compute instruction formats.
Figure 6D:
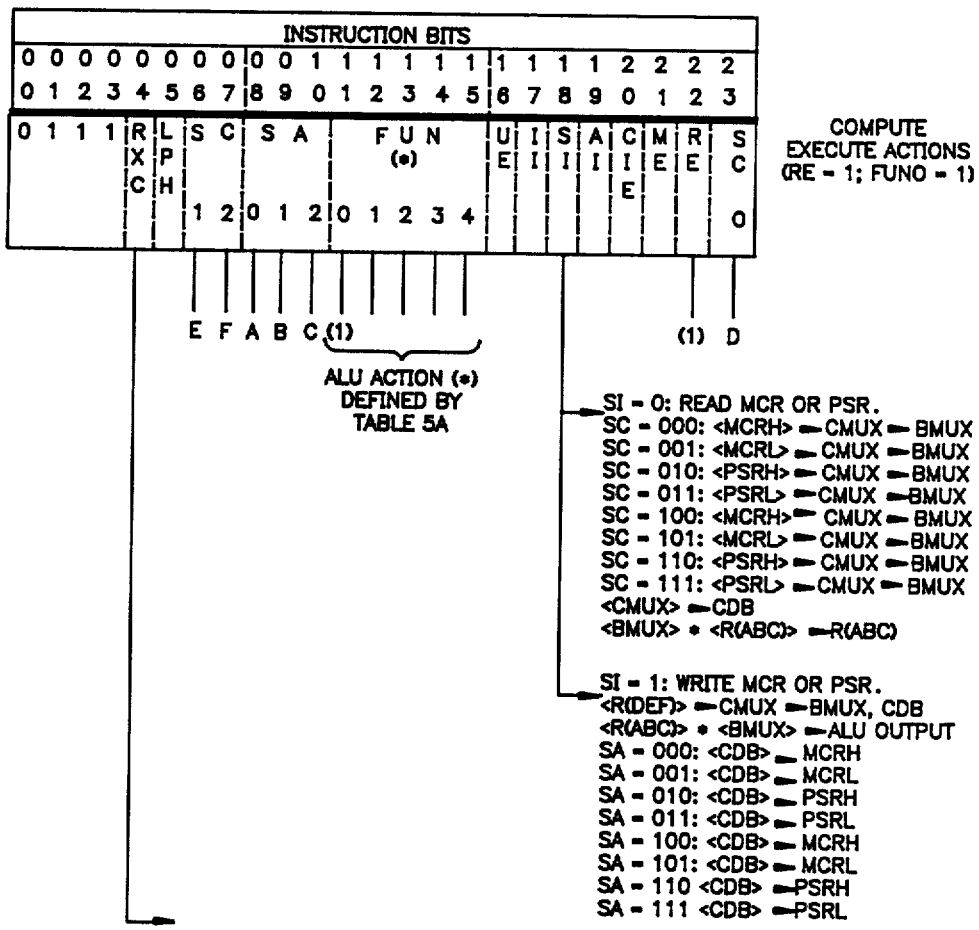
FIG. 6D completes the illustration of the compute insrruction formats.

The five instruction bits, 11 through 15, comprise the ALU 2 function select (FUN) field. Bit 11 of this field (FUN0) modifies the action performed to the extent that it can specify whether product or register information is to be presented to the "B" side of the ALU 2 and determine the ALU 2 function set to be utilized. Tables 5A and 5B respectively indicate th ALU 2 functions for FUN0=0 and FUN0=1. It shollld be noted that the particular set of functions selected (for the Compute instruction only) is determined by a combination of the Register Extension bit, RE, and FUN0. FIGS. 6B, 6C and 6D indicate which ALU 2 function select codes are to be used in each case.

Bits 16 through 22 of the Compute instruction provide a set of specialized control options. These are as follows:

Bit 16, the Unlock Enable bit (UE) allows, when it is on (1), conditions generated by the ALU 2 during execution of the instruction to be saved in PSRH 9 bits 6 and 11 through 15. When the bit is off (0), PSRH 9 is not allowed to change when the Compute is executed.

Bit 17, the Interrupt Inhibit (II) flag, provides interrupt protection for any instruction that follows a Compute instruction. That is, if II is on (bit=1), the next succeeding instruction accessed will be executed even if an interrupt is pending. This feature allows a Branch placed immediately after a protected Compute to execute on conditions generated by the Compute without chance of interruption.

The Stack Inhibit (SI) flag (bit 18) allows an ALU 2 result generated by the Compute to be inhibited from being written back into the stack 1. Write-back is inhibited when the bit is on (bit=1).

Bit 19, the "A" Inhibit (AI) flag, can be used to force the ALU 2 "A" input to be all zeros. Note that Tables 5A and 5B specifically indicate actions for AI=0 ("A" not inhibited); when AI=1, the term R SA in Tables 5A and 5B must be replaced with 0.

Selection of ALU 2 carry-in is implied by the FUN field specified as indicated in Tables 5A and 5B. In the Compute instruction, however, the Carry-In Enable (CIE) flag (bit 20) provides a means of inhibiting the selected carry-in. If not enabled (CIE=0) the actual carry-in to the ALU 2 is forced to be zero. Again, it should be noted that Tables 5A and 5B indicate the ALU 2 action performed when CIE=1.

The multiplier 3 pipeline will cycle when a Compute instruction is executed only when it is enabled to do so by having the Multiplier Enable (ME) control (bit 21) set to 1. Note that the variety of ALU 2 function control code used does not determine whether or not the multiplier pipeline 3 moves when executing a Compute; only the ME bit provides that control.

The Register Extension flag (bit 22) is used, as has been indicated above, to extend the number of sources that can be selected as inputs to the "B" side of the ALU 2. RE and FUN0 together determine the "B" input of the ALU 2 and select the ALU 2 function controls to be applied (as specified by Tables 5A, 5B).

Some additional notes:

1. The contents of the CMUX BUS 6 is placed on CDB 4 during the execution of any Compute. It can thus be used as an indirect branch-to address if an indirect branch instruction is placed immediately following a Compute.

2. The Compute instruction has no operand field so the value placed in CABR 5 at the end of the decode phase is meaningless.

The Store and Compute Instruction (STC)

All instructions with opcodes of the form 1XXX are somewhat similar in format (see FIG. 7). These are the compound or parallel instructions, so-called because they have both transfer and compute actions. The single opcode of the form 1000 denotes the Store and Compute (STC) instruction; the remaining seven opcodes (discussed below) are the Load, Select Multiplicand and Compute (LXC) instructions.

As indicated in FIG. 7, the STC instruction contains an SC field (bits 4, 6 and 7) to designate which of the eight stack 1 registers will be accessed so that its contents can be moved to RAM 24. Note that instruction bit 04, which is normally IX0, is used as SC0. The index control options are thus selected by only the IX1 bit (instruction bit 05). The two index control options permitted are indicated in FIG. 19. The remainder of the STC instruction is made up of a 3-bit SA field, a 5-bit FUN field and an 8-bit operand. The SA and FUN fields are identical in nature to those defined earlier for the Compute (C) instruction.

As with most of the other instruction types, decode actions for the STC instruction include the formation of an address. In the STC instruction, this involves adding the 8-bit operand field from the instruction to the contents of the selected index register (either R0 or R4) in the manner indicated in FIG. 19. Note from FIG. 19, that in doing this addition, the low-order operand bit is transposed to a position just above the high-order operand bit so that it will participate in producing the high-order 15 bits of the result that will be used (during execution) as an address. At the clock transition ending the decode cycle, the decoded instruction is loaded into the EXR 22 and the address formed is loaded into CABR 5.

As noted above, the STC has both transfer and compute execute actions. The transfer action that takes place involves the following:

1. During the execute cycle, the contents of the stack 1 register specified by SC (instruction bits 1, 2 and 3) are gated to the CMUX BUS 6 and the CDB 4; the address in CABR 5 is also placed on the CAB 23.

2. At the clock transition ending the execute cycle, the CDB 4 contents will be written into the RAM 24 or I/O address specified by the CAB 23 (CABR 5 contents).

Simultaneously, the following compute actions take place:

1. During the execute cycle, FUN0 (bit 11), the high-order bit of the FUN field (bits 11 through 15 of the instruction) will determine that either the CMUX BUS 6 contents or a product segment be gated to the "B" input of the ALU 2, at the same time the register specified by the SA field of the instruction is gated to the "A" ALU 2 input.

2. Then, still during the execute cycle, the ALU 2 will form a result as determined by the low-order four bits of the FUN field (see Tables 5A and 5B).

3. At the clock transition ending the execute cycle, the ALU 2 result will be disposed of as specified by the FUN field. That is, it will either be written into the stack 1 register specified by the SA field or not.

Some additional comments about STC are necessary:

1. Unlike the Compute instruction, the compound iinstructions contain no specific bit to control cycling of the multiplier 3 pipeline. For the STC instruction, cycling of the multiplier 3 pipeline is controlled by MCRH 8 bit 09 (see FIG. 9A), the MSF bit. When MSF is off, the multiplier 3 pipeline never moves when a STC instruction is executed; when MSF is on, the pipeline always moves on STC execution.

2. The selected register contents placed on the CMUX BUS 6 will be treated as a multiplicand input for the multiplier 3 if the multiplier pipeline is clocked.

The Load and Compute Instructions (LXC)

All instructions with opcodes of the form 1XXX (where XXX is not 000) are Load, Select Multiplicand and Compute (LXCn, where n=1 through 7) instructions. Like the STC instruction, these are also compound or parallel instructions because they cause both a transfer (RAM 24 to stack 1 register) action and a compute action.

The two low-order bytes of an LXC instruction contain an SA field, a FUN field and an operand that are identical to those in the STC instruction above. The high-order byte contains a 4-bit opcode field, a 2-bit IX field and a 2-bit SD field. The SD field of LXC (bits 6 and 7) form part of the address necessary to designate the destination register that is to receive data coming from RAM 24 via the CDB 4. The high-order SD bit, the bit that selects the left or right four-register group, is simply the inverse of the high-order bit of the SA field. Since the SA field specifies, among other things, the destination register for a result produced by the ALU 2, data going into a stack 1 register from the RAM 24 (via CDB 4) must go into the stack 1 input port not used by the ALU 2 result. In other words, an ALU 2 result uses the stack 1 input port specified by SA; data from CDB 4 going to the stack 1 is always directed to the unused input port.

Bits 1, 2 and 3 of the LXC instruction taken together comprise the address of the stack 1 register whose contents will be accessed and gated to the CMUX BUS 6 during execution. These three bits are actually part of the opcode field and cannot contain the combination 000 (that would make it an STC instruction). Thus, only stack 1 registers 1, 2, 3, 4, 5, 6, or 7 can be accessed via the "C" output port of the stack 1 in an LXC instruction. As is evident in FIG. 18, each of the seven LXC instructions implies one specific register for selection to the CMUX BUS 6, otherwise, all seven instructions are identical.

The selected register contents placed on the CMUX BUS 6 will also be treated as a multiplicand input for the multiplier 3 if multiplication is indicated by the FUN field (FUN0=1). Like the STC instruction, the LXC instruction has no specific bit to control cycling of the multiplier pipeline; instead, control of the multiplier pipeline is implied by the ALU 2 control function specified by the high-order bit (FUN0) of the FUN field. Thus, only ALU 2 function control codes of the form 1XXXX imply multiplier 3 pipeline movement in an LXC instruction.

Decode actions for the LXC instruction are identical to those of the STC except that the possible index control options are more extensive. As indicated in FIG. 19, the IX field combinations 00 and 01 designate a load immediate execute action while the combinations 10 and 11 designate a load execute action. The difference is seen at decode time to the extent that the process of forming an immediate value differs from that of forming an address. Each of these processes is defined in FIG. 19. Whatever the IX field value, the result of the index addition will be placed in CABR 5 at the clock transition ending the decode cycle, at the same time the decoded instruction is loaded into EXR 22.

Like the STC instruction, both a transfer and a compute action occur during the execute cycle of an LXC instruction. One of two possible transfer actions may take place when the LXC executes:

1. If the transfer is a load immediate operation, the contents of CABR 5 are gated to the Common Data Bus 4 (CAB) and on to the destination register (defined by SD and SA0 taken together) during the execute cycle. These data are loaded into the destination register at the clock transition ending the execute cycle.

2. If the transfer is a load operation, the contents of CABR 5 is gated to the Common Address Bus 23 (CAB) to be used as an address by RAM 24 or I/0. Data residing at that address will then be placed on the CDB 4 and gated to the designated destination register. Again, the clock transition ending the execute cycle will load the data into the destination register.

Compute actions for the LXC instruction are, in general, identical to those defined for the STC above. The one difference is that clocking of the multiplier pipeline is controlled by the high-order FUN bit (FUN0) rather than an MCRH 8 bit as noted above.

A general comment about the compound instructions is necessary: It is evident that the compound instructions, STC and LXC, do not have all the individual control bits that the Compute instruction has. Thus, in order to specify all the many possible control options for the compound instructions, the states of the individual controls are implied by the ALU 2 function control codes, the FUN codes. In other words, the various individual controls default to certain values for each distinct FUN code combination in the compound instructions. Note that the default of each individual control for each FUN code is defined in Tables 5A and 5B. When reading the tables, it is necessary to be aware of exactly what type of instruction is being considered so that the action defined for a particular FUN code can be correctly interpreted.

Additional Processor Features

The preceding two sections describe the essentials of the processor, including its pipeline operation and instruction set. This section deals with certain special features of the machine not previously discussed; in addition, the special interfaces are described.

Linear Extended Addressing Feature (LEAF)

Figure 12:
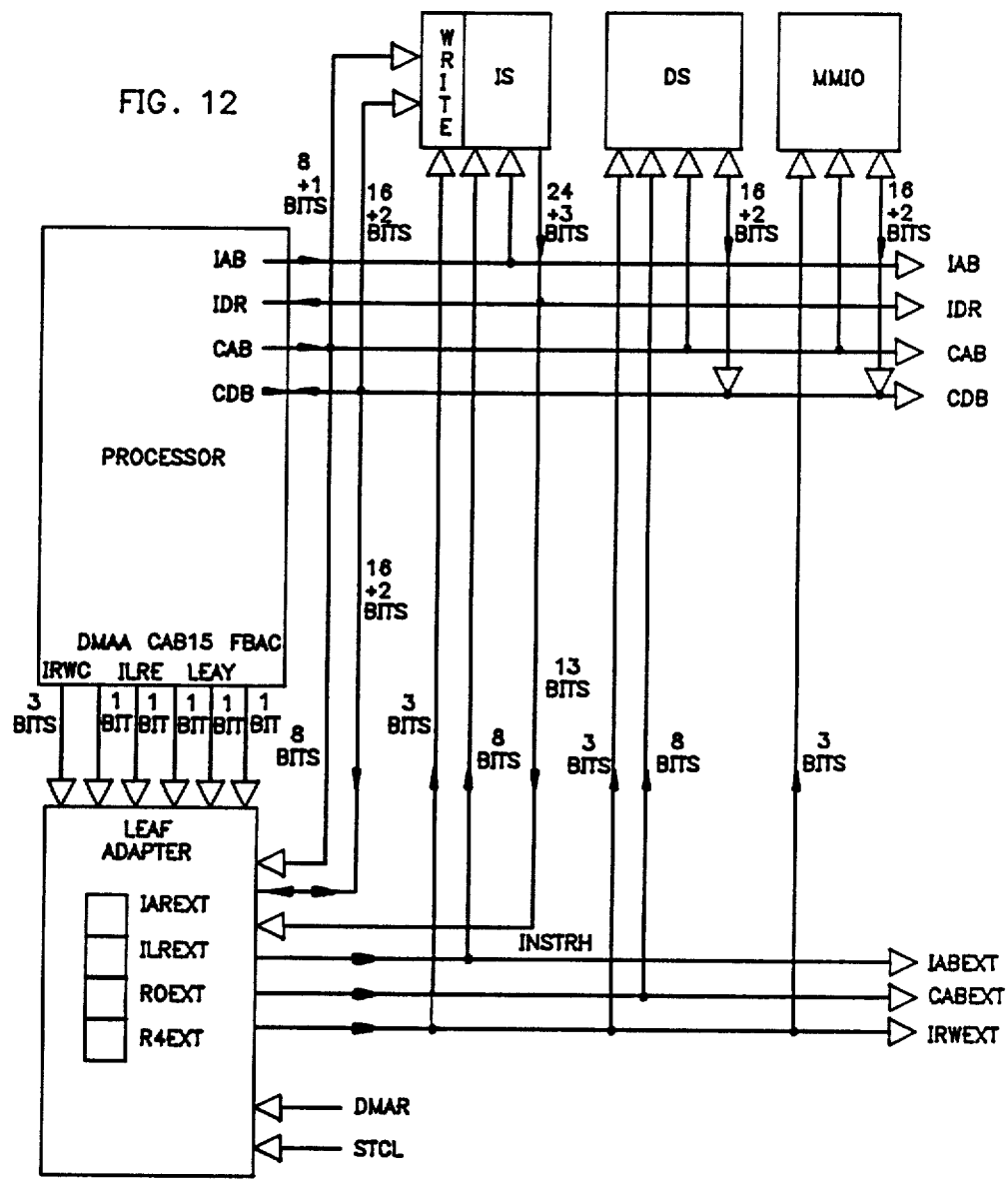
FIG. 12 illustrates schematically the extended addressing interface feature of the preferred embodiment of the invention.

The Linear Extended Addressing Feature (LEAF) is an optional feature, invoked by MCRL 8 bit 0, the LEA bit (see FIG. 8B, which allows both instruction and data store addressability of the processor to be extended by an additional 8 bits. The logic to accomplish this extension is contained almost entirely in an external LEAF adapter that is controlled by the processor. The interfaces between the processor and the LEAF adapter 27 are illustrated in FIG. 12.

The LEAF Adapter and Interfaces

Extended address operations are accomplished by the processor in conjunction with the LEAF adapter in the following way:

The LEAF adapter contains extensions, of up to 8 bits each, of the four addressing-related registers, IAR, ILR, R0 and R4, of the processor. Carries from the ADD GEN Adder 14 and the +1 Adder 25 in the processor (LEAF interface signals GY and LEAY respectively) are provided to the adapter 27 so that data and instruction address computations can be extended to the external registers.

Information decoded by the LEAF adapter 27 directly from the high-order 13 bits of fetched instructions, including the instruction type, addressing register used (none, R0, R4, ILR), branch type and the signal of the displacement, is used in conjunction with the address carries, LEAF and GY, to permit the LEAF adapted 27 to complete computation of 8-bit data and instruction address extensions in synchronism with the processor.

Flow control for LEAF operations is provided to the LEAF adapter 27 by means of the following interface signals (see FIG. 13):

1. ILRE defines the ILR hold latch status.
2. FBAC gives the state of the Foreground-Background latch.
3. Three IRWC (Interface Read/Write Control (bits are decoded to indicate if the current instruction is sequential or if a branch has been taken. Note that IRWC control bits are decoded somewhat differently in the LEAF mode (see FIG. 16).

LEAF Operation

In LEAF mode (MCRL 8 bit 0 is on), instructions such as Load (L) and Branch Long (BLU) require that extension registers in the LEAF adapter 27 be loaded from the processor. The scheme used for loading an extension register requires execution of a two-instruction sequence consisting of a Load instruction followed by a special conditional indirect Branch instruction. With this sequence, the third byte of the extended word is passed to the selected adapter register via the Common Address Bus 23 (CAB) during the third phase of the indirect branch instruction (when the CAB 23 is otherwise not used). The general form of the sequence is:

Load

Conditional Indirect Branch

The signal flow between the processor and the adapter 27 for two types of extended address instructions is illustrated in FIG. 13. In both cases, the Load instruction first moves the lower two types of the address to the CDB 4. Then, the following specialized conditional branch instruction (Opcode=0110, BT=01), causes two actions to take place:

1. In the first place, the branch is taken or not depending on the selection of the branch condition select code (BCS) to match the ALU 2 default conditions from the preceding Load instruction.

2. The third (high-order) byte of the extended address is presented to the LEAF adapter 27 via the Common Address Bus (CAB) 23.

As illustrated in FIG. 13, a Load/BC sequence with the branch not taken is used to load the external index registers. If a Load/BCI (Branch Conditional with store inhibited; Opcode=0100, BT=11) sequence is executed, the actual load of the stack 1 register is inhibited in addition to the action of the BC. The Load/BCI sequence is used to implement a Direct Branch or GOTO with extended addressing. Here the BCS code is selected so that the branch is taken.

If the two-instruction sequence executed is Load/-BALI (Branch and Link Indirect; Opcode=0110, BT=11), the ILR 15 is locked to save the return address for the branch in addition to the action of the BCI. A NOP is forced for the instruction following the BALI. Load/BALI sequences are used to provide the branch and link capability to apllications using extended addressing.

In general, the use of the CAB 23 during branches is unique to the LEAF mode of operation; this means that cycle steal (DMA) memory access cannot be used with extended address operation.

Indirect Program Access (IPA)

Figure 14:
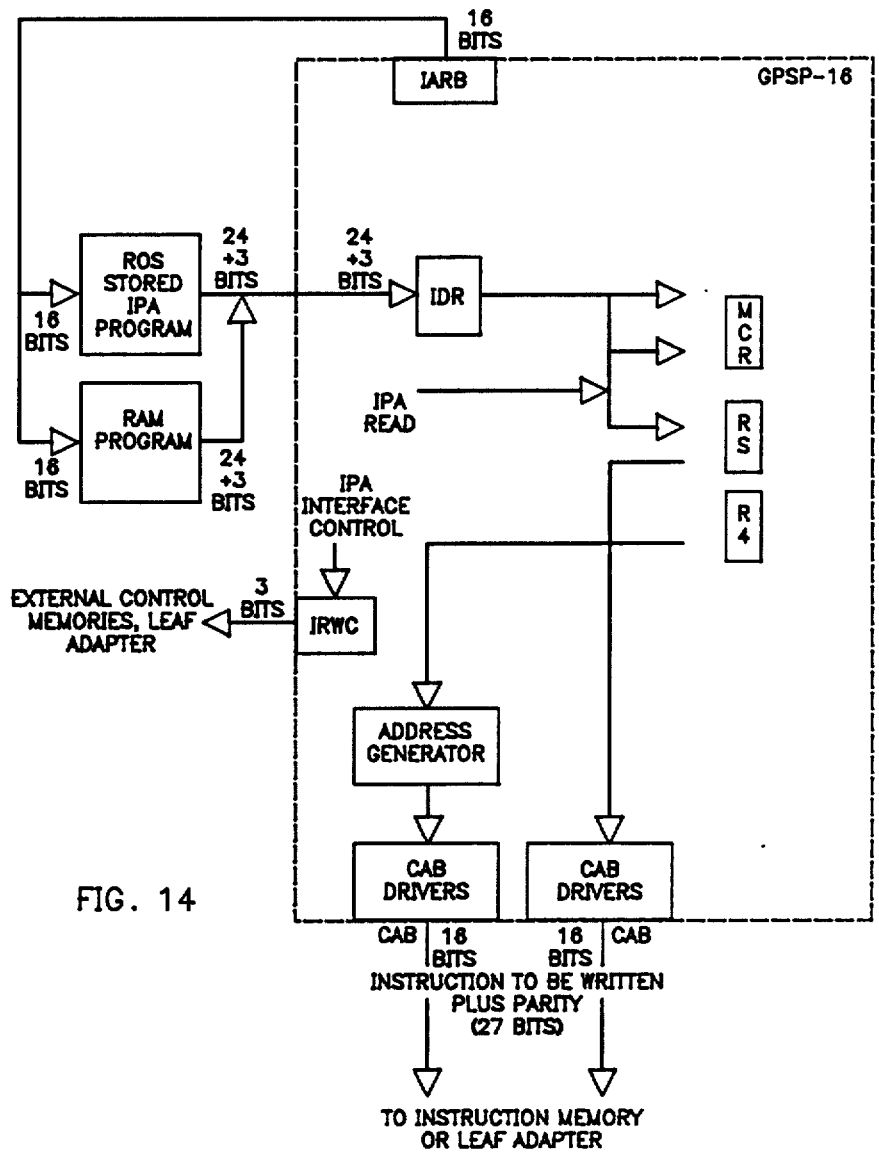
FIG. 14 illustrates schematically the data flow for an indirect program access function.

The Indirect Program Access (IPA) feature permits the processor to read and write its own instruction store. This allows application or diagnostic programs received via an I/O device (using a resident control program) to be written into instruction store. The control programs that allow this type of operation reside in instruction store 20 and may be contained in some form of ROS. Such resident I/O control programs can be designed to provide all the error checking and protocol logic required to operate with a local or remote host. FIG. 14 is a block diagram of the flow paths associated with IPA.

The IPA function is implemented in the processor with two special branch instruction variations, BIPAR (Branch, IPA Read) and BIPAW (Branch, IPA Write). The BIPAR inttruction permits an instruction from program store 20 to be read into the processor's internal registers (R5 and MCRH 8) where it can then be manipulated as data. A BIPAW instruction causes data from a pair of stack 1 registers within the processor (R0 or R4 and R5) to be written as an instruction into a specified instruction store 20 location.

IPA Read Operation

The IPA Read instruction, BIPAR, causes the specific execute actions indicated in FIG. 4B to take place. The BIPAR instruction is used in the following way to instigate an instruction read operation:

| IAR = | Instruction | Action Performed |
|---|---|---|
| N | BRANCH ADDRESS | Branch to ADDRESS |
| N+1 | BIPAR RETURN | Branch to N+2 |
| ADDRESS | | IDR contents to R5 and MCRH |
| N+2 | . . . | Etc. | where ADDRESS is the address of the instruction to be read.

The BIPAR is a variety of the Conditional Branch instruction (opcode=0100, BT=00, BCS code=1111, as shown in FIG. 4B) which causes two special actions to occur on phase three of its execution:

1. The instruction fetched from ADDRESS (by a branch to ADDRESS) is forced to be decoded as a LOAD IMMEDIATE to register R5. This causes the two lower bytes of that instruction to be moved into R5 on the next cycle.

2. A special data signal path is activated between the Instruction Decode Register 19 (IDR) and MCRH 8 (see FIG. 1) such that the upper-byte of the instruction to be read and its three parity bits are transferred into MCRH 8 bits 5 through 15.

These actions result in the instruction to be read and its parity being transferred from the IDR 19 to MCRH 8 and R5 where it can be treated as conventional register data. Note that the instruction read, although it passes through the IDR 19 like all other instructions, is not decoded or executed; it is merely moved into data register space of the processor.

IPA Write Operation

The IPA write function is provided by the BIPAW (BIPA Write) instruction, a special indirect branch (opcode=0100, BT=01, BCS code=1111) which, in addition to its branch properties, forces the content of register R5 onto the Common Data Bus 4 (CDB) on phase 3 of its execution (as if the branch were a Store R5 instruction). The actions of the BIPAW instruction are all summarized in FIG. 4C.

To use the BIPA Write instruction, it is first necessary to put the instruction bits to be stored into stack 1 registers R0 or R4 and R5. Low-order bits of the instruction to be written are placed in register R5; high-order instruction bits and parity bits are placed in register R0 or R4. A sequence of instructions, including BIPAW and BIPAR is then used to write the instruction bits from the stack 1 into instruction store 20 via the CAB 23 and CDB 4. The instruction sequence for an IPA Write operation is given below:

| IAR = | Instruction | Action Performed |
|---|---|---|
| N | LOAD ADDRESS | Contents of ADDRESS to CDB. |
| N+1 | BIPAW Disp (R4) | Branch to ADDRESS. |
| N+2 | BIPAR RETURN | Branch to RETURN; Write IS. |
| ADDRESS | | IDR contents to R5 and MCRH. |
| N+3 | . . . | Etc. | where ADDRESS is the memory location to be written.

In the above sequence, the LOAD moves the contents of ADDRESS to the Common Data Bus 4 where it provides the address for the indirect branch BIPAW. Since the address source for the BIPAW is the CDB 4, the ADD GEN Adder 14 can be used to provide the contents of R0 or R4 (plus displacement, as indicated in FIG. 19) via the CAB 23 during the third phase of execution. BIPAW also forces the contents of R5 to the CDB 4 during this phase, so that the entire instruction to be written, including its parity, appears in parallel at the output of the processor (two lower bytes from R5 via the CDB 4 and the upper byte plus parity from R0 or R4 via the CAB 23). The Interface Read/Write Control (IRWC) signals the external memory that the IPA Write can occur.

The BIPAR instruction in the write sequence prevents the instruction which is written to instruction store 20 from being executed when it is loaded into the IDR 19. The instruction enters the processor and is written into MCR 8 and R5 as described in the IPA Read operation above.

IPA Read and Write operations can be used with the extended addressing feature (LEAF) selected.

Diagnostics

The processor permits certain hardware and application parameters to be monitored for error conditions. These parameters are:
1. Application Parameters:
   a. ALU overflow, AV
   b. Multiplier overflow, MV
2. Hardware Parameters:
   a. Instruction parity, ISP (3 bits)
   b. Data store parity, DSP (2 bits)
   c. I/O parity, IOP (2 bits)

Any of the above parameters can be inhibited from error checking by setting the appropriate inhibit bit in MCRL (bits 3 through 7; see FIG. 8B).

When a valid (not inhibited) error check occurs, the violation is stored in PSRH 9 bits 0 through 4 (parity violation flags) and bit 13 (ALU 2 overflow flag). The multiplier 3 overflow flag is derived from the bits stored in the product register RP 28. Any violation causes the PSR 9 to be locked and the processor reset (PROR) forced.

When a PROR is initiated, the processor is forced to begin executing instructions starting at 0020 (hex). The processor reset also locks the Instruction Link Register 15 (ILR) thus enabling a diagnostic routine located in the PROR program to determine what the problem was by examining the PAR 9 contents and the location of the failing instruction from the ILR 15. PROR can also be forced by a special PSRL 9 load instruction.

Parity

Parity checking in the processor is complicated by pipeline effects and requires some special consideration. Parity is assumed to be odd and is validated by one parity bit per information byte. Parity is checked for the instruction store (three parity bits) when instructions are read. Data store and I/O parity (two parity bits) is checked for load instructions (when data store is read) and generated for external validation for store instructions (when data store is written). Parity is validated by generating reference parity within the processor and comparing it to the parity bits supplied from the external source.

Data parity violations are stored in PSRH 9 bits 3 and 4 for load operations as noted earlier. For all non-load instructions (those that do not use the CDB 4 on the processor interface) the output of the internal data bus parity generator, which is normally used for validating load information and generating parity for store operations, is stored in PSRH 9 bits 3 and 4. Saving the reference parity generator outputs in PSRH 9 permits the logic to be validated using the arithmetic unit of the processor.

When a PROR occurs, a diagnostic program must first interrogate MCRL 8 to properly interpret the results stored in PSRH 9. A process of elimination can then be used to decide if the check bits (PSRH 9 bits 3 and 4 in FIG. 9A) represent reference parity bits or data parity violations.

Instruction parity checking is enabled by MCRL 8 bit 3 and operates independently; thus, PSRH 9 will always reflect the result of both the instruction and data parity checks specified by MCRL 8 control bits 3 through 5 (FIG. 8B). The internal instruction parity generator can be validated by using the Indirect Program Access (IPA) feature previously described to transfer an instruction with questioned parity into the main data path of the processor where arithmetic facilities can be used to independently compute its parity.

The two tables below summarize the information placed into PSRH 9 bits 0 through 4 for all combinations of MCRL 8 controls and instruction types:

| | Instruction Parity | |
|---|---|---|
| | Instruction Parity | Check Control (MCRL Bit 3) |
| Instr. Type | Parity Check Enabled | Parity Check Inhibited |
| Any | Set Parity Violation | Set Parity Violation |

| | in PSRH Bits 0,1,2. Initiate PROR. | in PSRH Bits 0,1,2. No PROR. |
|---|---|---|
| | Common Data Bus Parity | |
| | CDB Parity Check Control (MCRL Bit 4, 5) | |
| Instr. Type | Parity Check Enabled | Parity Check Inhibited |
| Load (Using CDB) | Set Parity Violation in PSRH Bits 3,4. Initiate PROR. | Set Parity Violation in PSRH Bits 3,4. No PROR. |
| Non-Load (CDB Unused) | Set Internal Parity in PSRH Bits 3,4. No PROR. | Set Internal Parity in PSRH Bits 3,4. No PROR. |

Pipeline Effects

Due to the operation of the pipeline and the differences in error analysis time, the error parameters are not checked or recorded at the same time for a given instruction. This results in the address locked in the ILR 15 when reset occurs being displaced from the address of the failed instruction by a variable amount depending on the type of failure. The following illustrates this phenomenon assuming the failed instruction was at address N.

| Failure Type | Detected (set in PSR) | Processed (PROR set) | ILR Locked |
|---|---|---|---|
| ALU overflow | Phase 3+1 | Phase 3+2 | N+3 |
| Multiplier overflow | Phase 3 | Phase 3+1 | N+2 |
| Instruction parity | Phase 2 | Phase 3 | N+1 |
| Data-I/O parity | Phase 3+1 | Phase 3+2 | N+3 |

For sequential instructions (without branches), the address of the failed instruction can be derived by decrementing the value of the ILR 15 knowing the nature of the failure from the PSR 9.

Instruction Link Control

The displacement of ILR 15 relative to the failed instruction address does create a problem for some branch-related sequences. For example, in the sequences BRANCH/LOAD or BRANCH/COMPUTE, an error occurring on either the LOAD or COMPUTE will leave an address in the ILR 25 that is sufficiently displaced that it will contain an address in the BRANCH stream. The failing address cannot be determined from the ILR 15 contents.

To insure that errors can be traced to the failed address for such sequences, the processor has a selectable feature called Instruction Link Control (ILC). ILC enables error traceability by forcing two NOPs to be inserted into any detected BRANCH/LOAD BRANCH/COMPUTE sequences. The resulting sequences are as follows:

BRANCH/LOAD/NOP/NOP and BRANCH/COMPUTE/NOP/NOP

This insures that when the ILR 15 is locked, it will contain the address of the failed instruction. ILC is invoked for BRANCH/LOAD and BRANCH/COMPUTE sequences by bits 4 and 5 (ILCL and ILCC) of MCRH 8 (see FIG. 8A).

It should be noted that inverted sequences of the above types where the BRANCH follows the LOAD or COMPUTE do not create a flow problem because the ILR 15 is latched whenever a processor reset occurs on the third phase of a BRANCH. This insures that the ILR 15 is set with a sequential address prior to the BRANCH path being taken. This is a normal function of the ILR 15 control and is independent of the ILC bits in the MCR 8.

Diagnostic Application of Indirect Program Access (IPA)

The Indirect Program Access feature discussed previously permits instruction store to be loaded and read by the processor. As discussed, this enables the arithmetic facilities of the processor to be used to perform diagnostic checks (such as CRCs) on programs in the instruction memory 20.

Data Memory and I/O Interfaces

Data memory and I/O devices are attached to the processor via the external CDB 4 and addressed by the CAB 23. I/O devices are considered to in the same address space as data memory. I/O address space is selected to encompass one of four possible address ranges (0 to 31, 63, 127 or 255) by the IOS field of MCRL 8 (see FIG. 8B).

Device select and Read/Write control is provided by the Interface Read Write Control (IRWC) signals. In addition to the Data Memory and I/O control, IRWC also provides flow control, such as Branch Taken and Reset indications, to the LEAF adapter when extended addressing is used.

Direct Memory Access

Both the Instruction 20 and Data memories 1 can be accessed by an external device through Direct Memory Access (DMA) interface control. A DMA Request from an external device results in the internal clock being disabled on the next cycle boundary. At this time, a DMA acknowledge is indicated to the external device and the processor off-chip drivers are forced to their high impedance state allowing the external device to assume control of the memory buses. This state remains until the DMAR command is dropped, at which time DMAA is reset and the processor resumes its normal tasks on the next clock boundary.

DMA Anticipate (DMAC)

DMA Anticipate permits an external device to have control of the Data memory buses (CDB, CAB, IRWC) when they would otherwise not be used. This is the "DMA Cycle Steal" mode of operation. The DMAC interface signal alerts external devices that the instruction being decoded is neither a load or store so that the data buses will not be used by the processor on the next cycle and thus will be available.

External Rset (POWR)

External Reset (or "Power Reset" as it is called in the specification) as an externally generated signal that forces the processor to begin executing instructions starting at location 0000 (hex). This area of instruction store will contain a program designed to clear the machine. The action of POWR is very similar to that of any normal interrupt except that a POWR signal overrides all other conditions. Note that POWR can also be initiated by executing a special PSRL load instruction.

Having thus described our invention with reference to preferred embodiments thereof, it will be apparent to those of skill in the art that some departures in form or structure may be made without altering the basic essence of the improvements presented. Therefore, what is set forth in the following claims is intended by way of description and not by way of limitation wherefor what is claimed and desired to be protected by Letters Patent is:

1. An improved pipelined instruction processor comprising a system clock, a working register file, an instruction store, instruction decoding means, an arithmetic computation and logic unit, a multiplier and interconnecting data and instruction busses for directing digital data to said register file, to said arithmetic and logic unit and to said multiplier for controlling said arithmetic and logic unit and said multiplier in response to interrupts and executed instructions characterized in that:

said arithmetic and logic unit, said multiplier and said register file are interconnected via said busses, instructions from said instruction store being decoded in said instruction decoding means; and said system clock is connected to synchronize said arithmetic and logic unit to execute a decoded said instruction from said instruction store simultaneously with the decoding of a succeeding instruction therefrom and simultaneously with the feeding of a second succeeding instruction therefrom;

said register file is comprised of a plurality of full word registers arranged to be independently written or read in half-word portions;

during any cycle of said clock, the input of any said registers in said plurality is electively connected to said data bus for storing data there into and output of one of said registers in said plurality is selectively connected to one of said arithmetic and logic unit, said multiplier, and said data bus for outputting data thereto.

* * * * *

UNITED STATES PATENT AND TRADEMARK OFFICE
CERTIFICATE OF CORRECTION

PATENT NO. : 4,794,517
DATED : December 27, 1988
INVENTOR(S) : Gardner D. Jones; Larry D. Larsen; Daniel J. Esteban It is certified that error appears in the above-identified patent and that said Letters Patent is hereby corrected as shown below:

Column 32, Line 39, change "feeding" to -- fetching --.
            Line 44, change "any" to -- one of --.
            Line 45, change "electively" to -- selectively --.
            Line 46, change "there into" to -- thereinto --.
            Line 46, after "and" insert -- concurrently the --.

Signed and Sealed this

Twentieth Day of May, 1997

BRUCE LEHMAN

Attest:

Attesting Officer      Commissioner of Patents and Trademarks